United States Patent
Welch, Jr. et al.

(10) Patent No.: US 8,640,885 B2
(45) Date of Patent: *Feb. 4, 2014

(54) FLUID TREATMENT ARRANGEMENTS WITH SETS OF FLUID TREATMENT ELEMENTS AND METHODS FOR MAKING AND USING THEM

(75) Inventors: Thomas Welch, Jr., Homer, NY (US); Tanweer ul Haq, Tully, NY (US); Joseph Verschneider, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 700 days.

This patent is subject to a terminal disclaimer.

(21) Appl. No.: 12/531,718

(22) PCT Filed: Mar. 14, 2008

(86) PCT No.: PCT/US2008/056996
§ 371 (c)(1),
(2), (4) Date: Apr. 14, 2010

(87) PCT Pub. No.: WO2008/115789
PCT Pub. Date: Sep. 25, 2008

(65) Prior Publication Data
US 2010/0206820 A1    Aug. 19, 2010

Related U.S. Application Data

(60) Provisional application No. 60/907,066, filed on Mar. 19, 2007.

(51) Int. Cl.
*B01D 39/00* (2006.01)
*B01D 29/00* (2006.01)
*B01D 29/46* (2006.01)
*B01D 37/00* (2006.01)
*B01D 61/00* (2006.01)
*B01D 1/00* (2006.01)
*B01D 27/00* (2006.01)
*B01D 35/00* (2006.01)
*B01D 35/28* (2006.01)

(52) U.S. Cl.
USPC ........... 210/487; 210/767; 210/489; 210/488; 210/437

(58) Field of Classification Search
USPC .............. 210/336, 337, 338, 767, 323.1, 335, 210/339, 342, 315, 343, 345, 487, 493.4, 210/494.1, 494.2, 494.3, 489, 418, 420, 210/428, 433.1, 437, 456, 457
See application file for complete search history.

(56) References Cited

U.S. PATENT DOCUMENTS 1,792,797 A    2/1931    Armstrong
1,820,533 A    8/1931    Foley (Continued)

FOREIGN PATENT DOCUMENTS

DE    144 207 A1    10/1980
EP    0 291 883 A2    11/1988

(Continued)

*Primary Examiner* — Ling Choi
*Assistant Examiner* — Catherine S Branch
(74) *Attorney, Agent, or Firm* — Leydig, Voit & Mayer, Ltd.

(57) ABSTRACT

Fluid treatment arrangements having at least first and second radially displaced sets (12,13) of fluid treatment elements and methods for making and using them are disclosed: A ribbon including a permeable fluid treatment medium may be spirally wound in a plurality of windings to form a fluid treatment element of either set. At least two and as many as fifty or more fluid treatment elements (14', 14") may be positioned along a hollow core assembly (11) in each set. Fluid may be directed to or from the interior of the core assembly through a fluid treatment element of the first set and a fluid treatment element of the second set. In each fluid treatment element, fluid flows generally edgewise through the permeable fluid treatment medium.

20 Claims, 8 Drawing Sheets

(56) References Cited

U.S. PATENT DOCUMENTS

| | | | |
|---|---|---|---|
| 1,824,079 | A | 9/1931 | Foley |
| RE19,359 | E * | 11/1934 | Armstrong ................ 210/494.1 |
| 2,339,703 | A | 1/1944 | Kamrath |
| 2,537,897 | A | 1/1951 | Hunter |
| 2,561,685 | A | 7/1951 | Boggs |
| 2,631,732 | A | 3/1953 | Vocelka |
| 2,646,887 | A | 7/1953 | Robinson et al. |
| 2,816,665 | A | 12/1957 | Layte et al. |
| 3,061,107 | A | 10/1962 | Taylor |
| 3,165,471 | A | 1/1965 | Hencken |
| 3,347,391 | A | 10/1967 | Steensen |
| 3,592,769 | A | 7/1971 | Decker |
| 4,202,772 | A * | 5/1980 | Goldstein ..................... 210/232 |
| 4,588,500 | A * | 5/1986 | Sprenger et al. ............. 210/100 |
| 4,695,300 | A | 9/1987 | Takagi |
| 4,792,397 | A | 12/1988 | Rasmussen |
| 5,759,391 | A * | 6/1998 | Stadtmuller ................. 210/222 |
| 6,113,784 | A | 9/2000 | Stoyell et al. |
| 6,669,844 | B2 | 12/2003 | Strohm et al. |
| 6,827,851 | B1 | 12/2004 | Strohm et al. |
| 7,351,345 | B2 | 4/2008 | Diemer et al. |
| 7,357,866 | B2 | 4/2008 | Diemer et al. |
| 2002/0046971 | A1 | 4/2002 | Strohm et al. |
| 2004/0035783 | A1 | 2/2004 | Strohm et al. |
| 2004/0079694 | A1 | 4/2004 | Diemer et al. |
| 2004/0094467 | A1 * | 5/2004 | Diemer et al. ................ 210/347 |
| 2005/0155923 | A1 | 7/2005 | Diemer et al. |
| 2006/0254973 | A1 * | 11/2006 | Olsen et al. .................. 210/338 |
| 2008/0169234 | A1 | 7/2008 | Diemer et al. |
| 2008/0230470 | A1 | 9/2008 | Diemer et al. |

FOREIGN PATENT DOCUMENTS

| | | |
|---|---|---|
| EP | 0 666 094 A2 | 8/1995 |
| FR | 873 926 A | 7/1942 |
| GB | 9228 | 0/1911 |
| JP | 60-238112 A | 11/1985 |
| JP | 62-123215 U | 8/1987 |
| WO | WO 01/21279 A1 | 3/2001 |
| WO | WO 03/041829 A2 | 5/2003 |
| WO | WO 2007/017110 A1 | 2/2007 |
| WO | WO 2007/017111 A1 | 2/2007 |

* cited by examiner

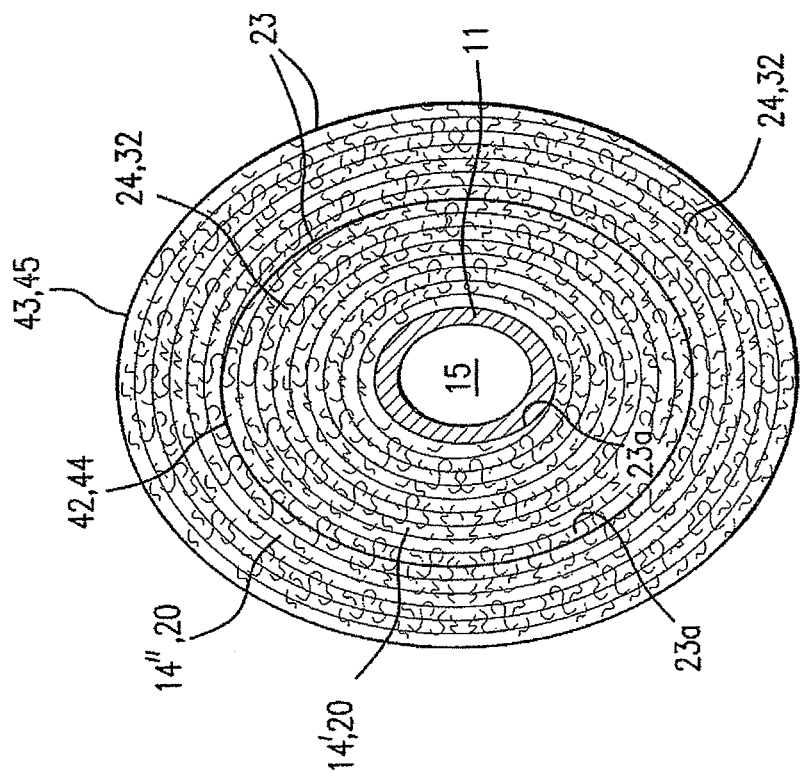
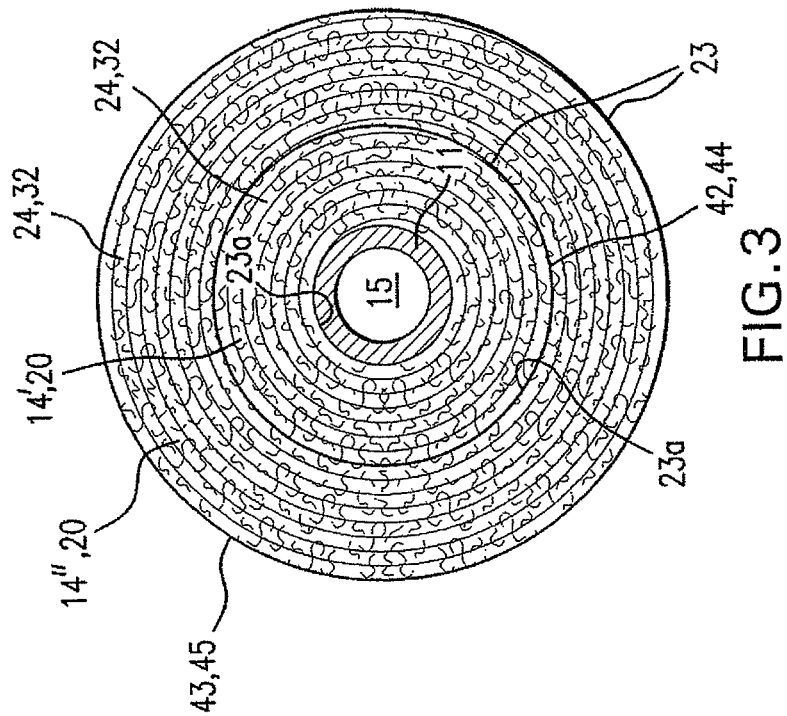

FLUID TREATMENT ARRANGEMENTS WITH SETS OF FLUID TREATMENT ELEMENTS AND METHODS FOR MAKING AND USING THEM

This application claims priority based on U.S. Provisional Application No. 60/907,066, which was filed on Mar. 19, 2007, and is incorporated by reference.

DISCLOSURE OF THE INVENTION

The present invention relates to fluid treatment arrangements and to methods for making and using them. In particular, the present invention relates to fluid treatment arrangements and methods for making and using fluid treatment arrangements which include spirally wound fluid treatment elements. A fluid treatment element may be fashioned by spirally winding a ribbon in a plurality of windings to form a generally disk-shaped body. The ribbon may include a long, narrow strip of a permeable fluid treatment medium having first and second opposite major surfaces and first and second opposite side edges. The disk-shaped body may have an end surface, e.g., an inflow surface, which faces in one direction, another end surface, e.g., an outflow surface, which faces in the opposite direction, and an outer rim. To form a fluid treatment arrangement, several of these fluid treatment elements may be positioned along a hollow core assembly with a space between some or all of the elements.

A fluid may be directed through a fluid treatment element, i.e., from the inflow surface to the outflow surface of the fluid treatment element. As the fluid passes through the fluid treatment element, the fluid may pass generally edgewise through the permeable fluid treatment medium of each winding, i.e., the fluid may flow generally laterally within the permeable medium generally parallel to the first and second opposite major surfaces of the ribbon. The fluid may also flow radially from the permeable fluid treatment medium of one winding into and then laterally along the permeable medium of one or more adjacent or nearby windings.

Fluid treatment arrangements embodying one or more aspects of the invention may be used to treat fluids, including gases, liquids, or mixtures of gases, liquids, and/or solids. As the fluid passes through the fluid treatment element, the fluid may be treated in any of numerous ways, depending on the fluid treatment characteristic of the fluid treatment element, and there are many different fluid treatment characteristics. For example, the fluid treatment characteristic may relate to a pore structure or a removal rating of the fluid treatment medium which retards or prevents passage of particulates or molecules above a certain size and filters these particulates or molecules from the fluid as the fluid flows through the fluid treatment element. As another example, the fluid treatment characteristic may relate to a chemical or biochemical agent on or in the fluid treatment medium which binds to one or more substances, e.g., molecules, proteins, and/or nucleic acids, in the fluid and separates these substances from the fluid as the fluid flows through the fluid treatment element. As yet another example, the fluid treatment characteristic may relate to a sorbent material in or on the fluid treatment medium which absorbs or adsorbs one or more substances, e.g., molecules or compounds, from the fluid and separates these substances from the fluid as the fluid flows through the fluid treatment element. As a further example, the fluid treatment characteristic may relate to a surface chemistry of the fluid treatment medium which aggregates small droplets of liquid entrained in the fluid and produces larger droplets that may be more easily removed from the fluid.

SUMMARY OF THE INVENTION

In accordance with one aspect of the invention, fluid treatment arrangements may comprise a hollow core assembly, at least first and second sets of fluid treatment elements mounted along the core assembly, and a fluid flow path through a fluid treatment element of one set and a fluid treatment element of the other set. The core assembly has an interior and an axis. A plurality of fluid treatment elements of each set includes a ribbon which has a permeable fluid treatment medium. The ribbon is wound in a plurality of windings to form a generally disk-shaped body which has a radial dimension. The disk-shaped body also has a first end surface on one side of the body, a second end surface on the other side of the body, and an outer rim. The second set of fluid treatment elements is radially displaced from the first set of fluid treatment elements. The fluid flow path extends between the first and second end surfaces of a fluid treatment element of the first set and between the first and second end surfaces of a fluid treatment element of the second set to or from the interior of the core assembly.

In accordance with another aspect of the invention, methods for making a fluid treatment arrangement may comprise mounting first and second sets of spirally wound, disk-shaped fluid treatment elements along a hollow core assembly. Mounting the first and second sets of fluid treatment elements along the core assembly includes radially displacing the second set of fluid treatment elements from the first set of fluid treatment elements.

In accordance with another aspect of the invention, methods for treating a fluid may comprise directing a fluid between the exterior of a fluid treatment arrangement and the interior of a hollow core assembly, which includes (1) passing fluid generally edgewise through windings of a permeable fluid treatment medium of a first fluid treatment element and (2) passing fluid generally edgewise through windings of a permeable fluid treatment medium of a second fluid treatment element that is radially displaced form the first fluid treatment element.

Embodiments of the invention provide many advantages. For example, by providing first and second sets of fluid treatment elements radially displaced from one another, the fluid may flow through at least two fluid treatment elements, e.g., an element of the first set and an element of the second set, as the fluid passes between the exterior of the fluid treatment arrangement and the interior of core assembly. Treatment of the fluid may thus be significantly enhanced. Further, by radially displacing first and second sets of fluid treatment elements along the core assembly, axially shorter fluid treatment arrangements with larger diameters may be formed. Shorter, larger diameter fluid treatment arrangements may more efficiently use the space within many housings.

BRIEF DESCRIPTION OF THE DRAWINGS

FIG. 3 is a front view of the fluid treatment elements of FIG. 1.

FIG. 4 is a front view of other fluid treatment elements.

DESCRIPTION OF EMBODIMENTS

Figure 1:
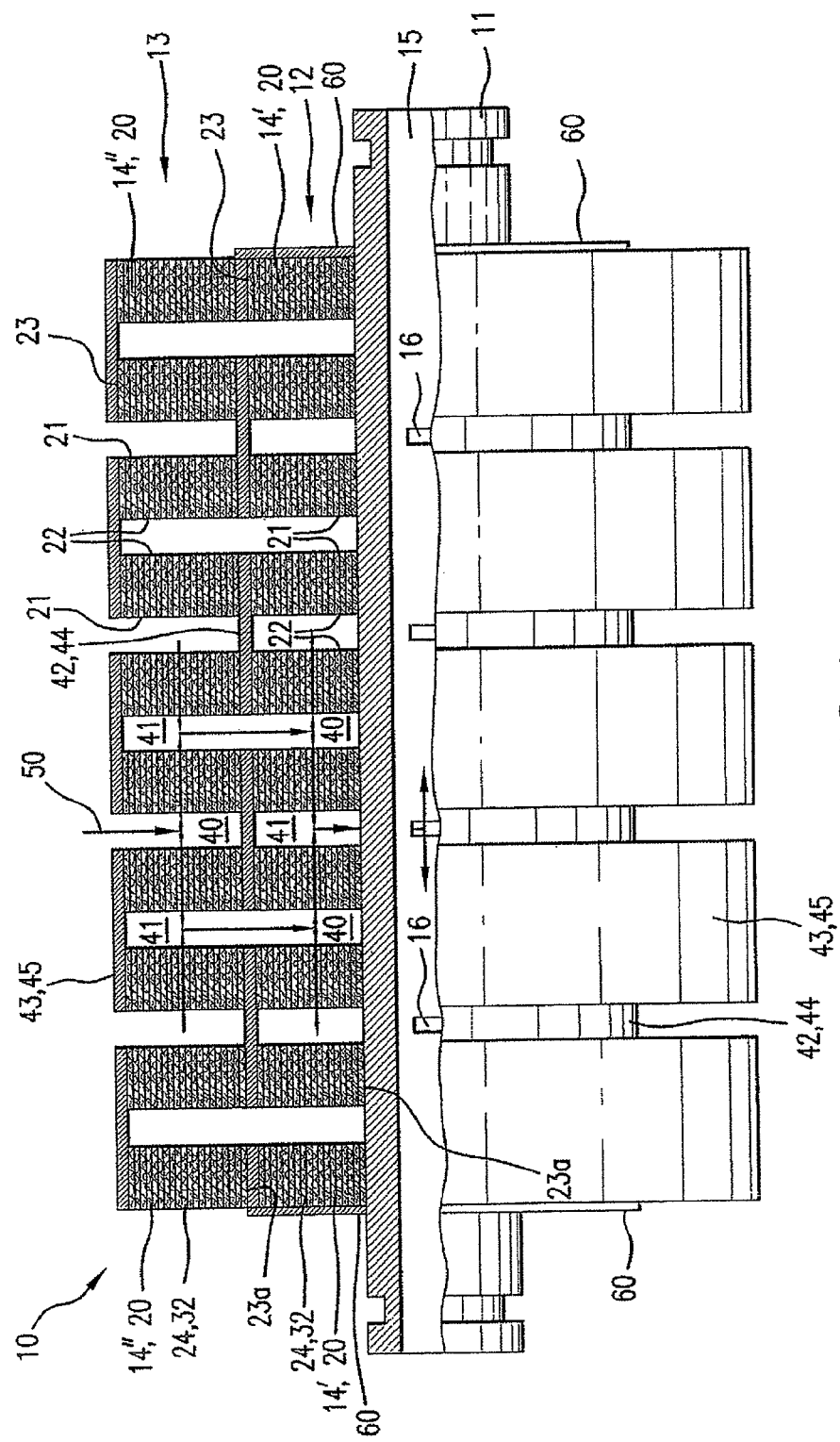
FIG. 1 is a quarter sectioned view of a fluid treatment arrangement.

Fluid treatment arrangements having multiple, radially displaced sets of fluid treatment elements, e.g., two, three, four, five or more sets, may be configured in a wide variety of ways. One example of a fluid treatment arrangement 10 is shown in FIG. 1, but fluid treatment arrangements are not limited to the features illustrated in this figure. The fluid treatment arrangement 10 may comprise a core assembly 11 and at least two radially displaced sets, e.g., inner and outer sets 12, 13, of spirally wound fluid treatment elements 14', 14" mounted along the core assembly 11. The core assembly 11 may comprise a core, such as a pipe or a tube, having an axis, a generally hollow configuration, including an interior 15, and two open ends or an open end and a closed or blind end. The core assembly 11 may also have openings 16, e.g., axially separated openings, such as slots or other perforations, along the core between the ends.

Figure 2A:
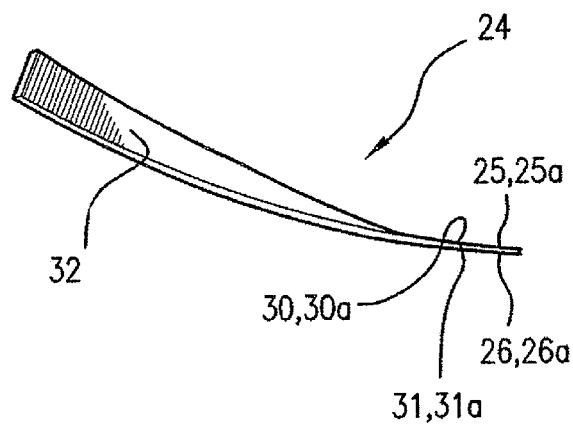
FIGS. 2A and 2B are oblique views of two ribbons.
Figure 2B:
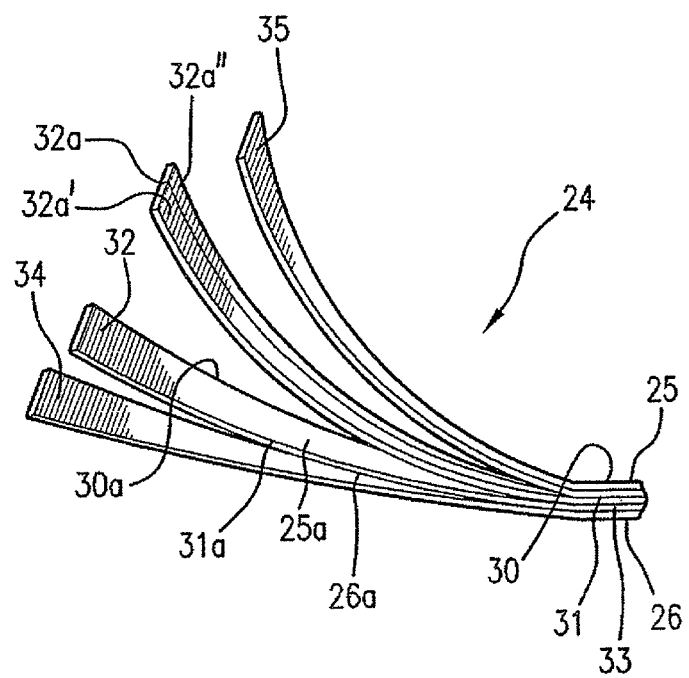

Most or all of the fluid treatment elements 14', 14" of both sets 12, 13 may comprise a generally disk-shaped body 20 having one end surface 21 on one side of the body 20, another end surface 22 on the opposite side of the body 20, and an outer rim 23 and an inner rim 23a. The disk-shaped bodies 20 may comprise a plurality of spiral windings of long, narrow ribbons. The ribbons may be configured in a wide variety of ways. Examples of two ribbons 24 are shown in FIGS. 2A and 2B, but ribbons are not limited to the features illustrated in these figures. Each ribbon 24 may have a long, narrow configuration with opposite major surfaces 25, 26 and opposite side edges 30, 31. The ribbon 24 includes at least one strip of a permeable fluid treatment medium 32 which also has opposite major surfaces 25a, 26a and opposite side edges 30a, 31a. The ribbon 24 including the porous fluid treatment medium may be permeable but unperforated, i.e., free of any through holes or through slots which extend between the opposite major surfaces 25, 26; 25a, 26a. One or both side edges 30, 31; 30a, 31a of the ribbon 24, including the permeable fluid treatment medium 32, may be generally straight or even or may be pinked, fringed, or frizzed. Each end surface 21, 22 of the disk-shaped body 20 comprises the plurality of spiral windings of a side edge 30, 31 of the ribbon 24, including a side edge 30a, 31a of the permeable fluid treatment medium 32. One or both end surfaces 21, 22 may be an even surface or an uneven surface, for example, as disclosed in U.S. Provisional Patent Application No. 60/907,065 entitled Fluid Treatment Elements and Fluid Treatment Arrangements with Fluid Treatment Elements Having Uneven Surfaces and Methods of Making and Using Them, which lists Thomas Welch, Jr., Stephen Geibel, and Tanweer ul Haq as an inventor and which was filed on Mar. 19, 2007, and the PCT International Application which claims priority based on this Provisional Application, both of which are incorporated by reference to support these and other features.

The permeable fluid treatment medium may be formed from any of numerous materials, including, for example, a natural or synthetic polymer, glass, metal, carbon, and/or ceramic. The permeable fluid treatment medium may be formed from any of a variety of structures, including, for example, fibrous structures, such as woven or non-woven fibrous strips; meshes, such as woven, extruded, or expanded mesh strips; permeable membranes, such as supported or unsupported membrane strips; porous foam strips; or porous metals, such as porous sintered fiber metal or powder metal strips.

The permeable fluid treatment medium may have any of a myriad of treatment characteristics. For example, the permeable fluid treatment medium may have, or may be modified to have, any of several fluid treatment characteristics including, without limitation, a positive or negative electrical charge; a liquiphobic or liquiphilic surface characteristic, including, for example, a hydrophobic or hydrophilic or oleophobic or oleophilic surface characteristic; attached functional groups, such as ligands or any other reactive moiety, that can chemically bind to substances in the fluid; or incorporated functional materials that may chemically or physically bind to, react with, catalyze, deliver, or otherwise affect substances within the fluid and/or the fluid itself, including, without limitation, sorbents, reactants, catalysts, and chromatography media of all types. More specifically, the functional material may include activated carbon, silica, zeolite, molecular sieves, clay, alumina, sodium bicarbonate, ion exchange resins, catalytic agents, metal oxides, oxidizing agents, reducing agents, buffering agents, biocidal agents, fungicidal agents, viricidal agents, air freshening agents, and perfuming agents. The functional material may be incorporated in the fluid treatment medium, e.g., bonded to, coated on, immobilized in, and/or formed as the fluid treatment medium. For some embodiments, the functional material may be in the form of particles or fibers immobilized in the fluid treatment medium. Further, a fluid treatment characteristic of the permeable fluid treatment medium may include any of a wide range of removal ratings or pore structures, including, for example, from ultraporous or nanoporous or finer to microporous or coarser. For example, the fluid treatment characteristic may include a removal rating in the submicron range or finer, e.g., up to about 0.02 µm or coarser or up to about 0.1 µm or coarser, or in the micron range or coarser, e.g., up to about 1 µm or coarser, or about 5 µm or coarser, or about 10 µm or coarser, or about 50 µm or coarser, or about 75 µm or coarser, or about 100 µm or coarser, or about 200 µm or coarser, or about 300 µm or coarser, or about 500 µm or coarser, or about 1000 µm or coarser.

The fluid treatment media of all of the fluid treatment elements of all of the sets may have the same fluid treatment characteristic. Alternatively, the fluid treatment characteristics may differ from one fluid treatment medium to another within a single fluid treatment element or among two or more fluid treatment elements, for example, as disclosed in U.S. Provisional Application No. 60/907,069 entitled Fluid Treatment Elements and Fluid Treatment Arrangements with Fluid Treatment Elements Having Different Fluid Treatment Characteristics and Methods for Making and Using Them which listed Thomas Welch, Jr., Mark Hurwitz, Tanweer ul Hag, and Joseph Verschneider as an inventor and which was filed on Mar. 19, 2007, and the PCT International Application which claims priority based on this Provisional Application, both of which are incorporated by reference to support these and other features. For many embodiments, at least one, e.g., some or all, of the fluid treatment media of the fluid treatment arrangement may comprise a filter medium, for example, of non-woven glass or polymeric fibers, and the fluid treatment characteristic of the fluid treatment medium may comprise a removal rating of about 0.02 µm or coarser.

The ribbon 24 may include the strip of permeable fluid treatment medium 32 as the sole component of the ribbon, as shown in FIG. 2A, and the major surfaces of the ribbon and the fluid treatment medium may be in contact along adjacent windings. Alternatively, the ribbon may include multiple components. For example, the ribbon 24 may include the permeable fluid treatment medium as one layer of a multi-layer composite 33 which includes a plurality of layers superposed on one another, as shown in FIG. 2B. Various additional layers may be included, such as an additional layer of a permeable fluid treatment medium 32a. The fluid treatment media 32, 32a may be identical to, or different from, one another. For example, the permeable fluid treatment medium layers may have the same fluid treatment characteristics or different fluid treatment characteristics, providing a fluid treatment element with fluid treatment media having different fluid treatment characteristics in parallel with one another. Another additional layer may be a strengthening strip 34 that enhances the structural integrity of the ribbon. The ribbon may be in tension as it is wound in multiple windings to form the fluid treatment element, and the strip of permeable fluid treatment medium may not have sufficient strength to withstand the tension. Consequently, a strengthening strip 34 that can withstand the tension, such as a strip of a polymeric film, may be layered with the fluid treatment medium. Another additional layer may be a bonding strip 35 for bonding adjacent surfaces of adjacent windings of the ribbon. The multiple layers of the composite ribbon may not all have of the same width or be in register. The ends of the layers may be in register or may be staggered. For many embodiments, the thickness of the additional layers, other than any additional fluid treatment medium layers, may be less than the thickness of the fluid treatment medium layers to increase the relative volume of the fluid treatment medium within the fluid treatment element. To reduce the amount of fluid that may bypass the fluid treatment medium as it flows through the fluid treatment element, the resistance to fluid flow edgewise through the additional layers may be at least substantially equal to or greater than the resistance to fluid flow edgewise through the fluid treatment medium layer. For some embodiments, the permeability edgewise through the additional layers may be substantially equal to or less than the permeability edgewise through the fluid treatment medium layers, and/or the removal rating edgewise through the additional layers may be substantially equal to or finer than the removal rating edgewise through the fluid treatment medium layers. For some embodiments some or all of the layers of the composite ribbon, other than the fluid treatment medium layers, may be impermeable. Alternatively, the resistance to fluid flow edgewise through the additional layers may be less than the resistance to fluid flow edgewise through the fluid treatment medium layers. For some embodiments, the permeability edgewise through the additional layers may be greater than the permeability edgewise through the fluid treatment medium layers, and/or the removal rating edgewise through the additional layers may be coarser than the removal rating edgewise through the fluid treatment medium layers.

Alternatively or additionally, the ribbon may include multiple components, e.g., two, three, four, five, or more components, that are arranged side-by-side in series in the fluid flow path edgewise through the ribbon. The side-by-side components may have spaces or intervening structures between them or may be arranged in close proximity, e.g., in contact. For example, multiple strips of fluid treatment media may be arranged edge side-by-edge side. The additional layer 32a of porous fluid treatment medium shown in FIG. 2B is but one example of a side-by-side arrangement of multiple strips. One strip 32a' may be positioned coplanar with and in close proximity to an adjacent strip 32a". For example, the side edges of the strips 32a', 32a" may contact one another along the length of the ribbon 24. The media may be similar to or different from another. For some embodiments, two or more of the media may have different pore sizes, e.g., each successive medium may have a larger or smaller removal rating or pore structure, providing a pore size gradient across the width of the ribbon. For example, the downstream strip of fluid treatment medium may have a finer removal rating or pore structure than the upstream strip of fluid treatment medium. For other embodiments, two or more of the media may provide a different kind of fluid treatment, e.g., filtration, sorption, and ion exchange. The strips in the side-by-side arrangement may have similar or different widths, thicknesses, and/or lengths. The side-by-side strips may be supported in a variety of ways. For example, the multiple strips may be superposed with a support layer. The support layer may be thin and impermeable and may have a width which is less than, about equal to, or greater than the combined widths of the fluid treatment media strips.

The ribbon, including the strip of permeable fluid treatment medium, may have a variety of lengths, thicknesses, and widths. For many embodiments, the ribbon may be continuous and extend the full length required to provide a sufficient number of windings to form a fluid treatment element having any desired radial dimension. For other embodiments, shorter segments of the ribbon may be connected end-to-end to extend the full length. Further, for many embodiments, the ribbon may be generally straight along the length of the strip. However, the ribbon may be curved. For example, the ribbon may have a cyclical, e.g., sinusoidal or sawtooth, pattern which extends along the length of the strip.

The thickness of the ribbon, including the strip of permeable fluid treatment medium, i.e., the distance through the ribbon from one major surface to the opposite major surface, may vary from one ribbon to another and/or from one fluid treatment element to another, depending, for example, on the structure of the porous fluid treatment medium. The thickness may be in the range from about two thousandths of an inch or less, for example, for a thin permeable polymeric membrane, to about 250 thousandths of an inch or more, for example, for a lofty fibrous material or a porous foam. Although the thickness may be nonuniform along the length of a ribbon, for many embodiments the thickness is uniform along the length of the ribbon.

The width of the ribbon, including the width of the strip of permeable fluid treatment medium, i.e., the maximum lateral distance through the ribbon from one side edge to the opposite side edge, may be similar or may vary from one ribbon to another and/or from one fluid treatment element to another. As fluid flows through a fluid treatment element 14', 14", fluid may pass generally edgewise through the ribbon 24 and the strip of permeable fluid treatment medium 32 from one side edge 30, 30a; 31, 31a to the opposite side edge 31, 31a; 30, 30a. Consequently, the width of the ribbon may affect the pressure drop and the degree of treatment that the fluid undergoes. For example, the width of the ribbon may affect the filtration efficiency. For many embodiments, the width may be in the range from about one-sixteenth of an inch or less to about 1 inch or 2 inches or 3 inches or more. For example, the width may be in the range from about 2 inches or less, e.g., 1 inch or less, to about one-sixteenth inch or more, including the range from about one-eighth inch or more to about one-half inch or less. Further, the width may be generally uniform along the length of the ribbon, providing a more uniform treatment of the fluid as it flows through the fluid treatment element. Alternatively, the width of the ribbon may vary along the length, e.g., providing a fluid treatment element which tapers to a narrow rim or flares to a wide rim. The width of the ribbon may also vary over a shorter distance, e.g., providing a ribbon with one or two pinked edges. Ribbons with pinked, as well as fringed or frizzed, edges are disclosed, for example, in previously referenced U.S. Provisional Application No. 60/907,065 entitled Fluid Treatment Elements and Fluid Treatment Arrangements with Fluid Treatment Elements Having Uneven Surfaces and Methods for Making and Using Them and the PCT International Application which claims priority based on this Provisional Application.

Figure 6:
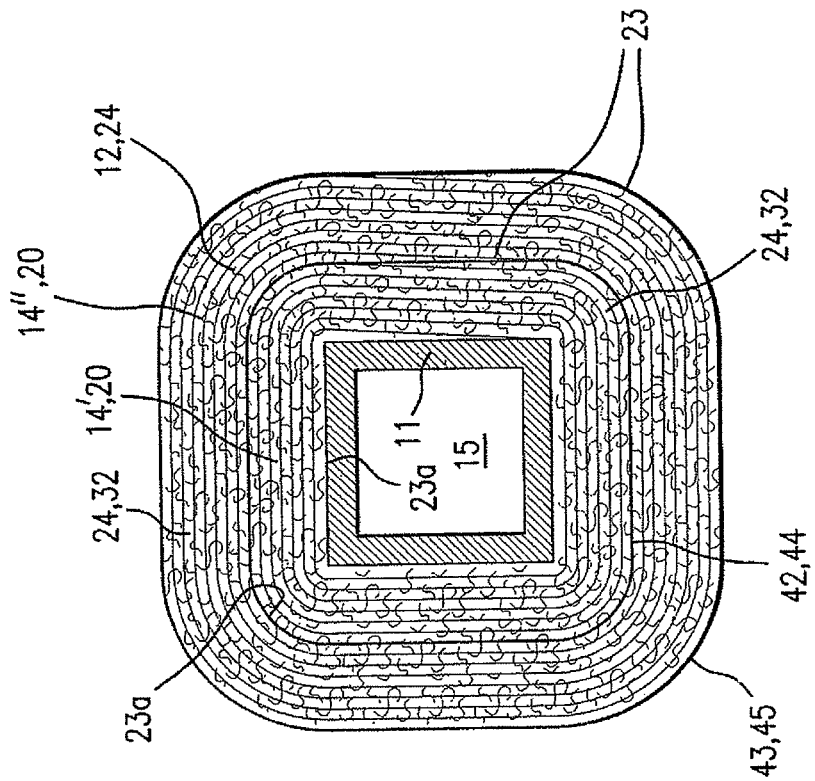
FIG. 6 is a front view of other fluid treatment elements.
Figure 5:
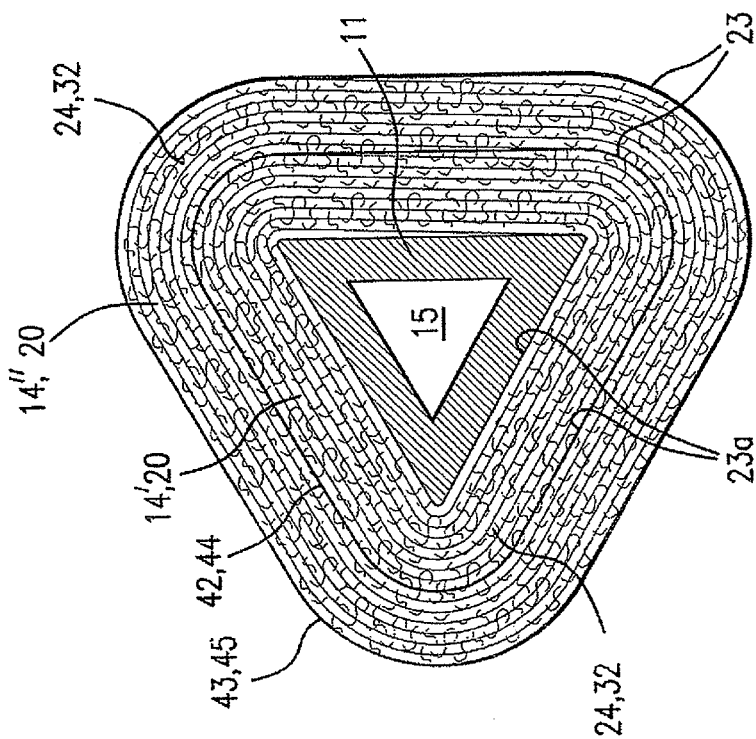
FIG. 5 is a front view of other fluid treatment elements.

A fluid treatment element 14', 14" formed by spirally winding the ribbon 24 in a plurality of windings may have any of numerous irregular or regular geometrical forms. For example, each spirally wound disk-shaped body 20, as well as the core assembly 11, of the fluid treatment elements 14', 14" may have a generally circular form, as shown in FIG. 3, or a generally oval, triangular, or rectangular form, as shown in FIGS. 4, 5, and 6, respectively. The radial dimension of each fluid treatment element 14', 14", i.e., the dimension generally perpendicular to the axis of the core assembly 11, for example, from the innermost winding to the outermost winding, may vary, for example, in accordance with the number of windings and the thickness of the ribbon. For example, the radial dimension may be in the range from about ¼ inch or less or about ⅝ inch or less to up to about 1 inch or up to about 2 inches or up to about 6 inches or up to about 10 inches or up to about 25 inches or more. The radial dimensions of the fluid treatment elements in each set 12, 13 or from set to set may be similar, e.g., substantially equal, or they may differ. For many embodiments, the inner diameters of the fluid treatment elements 14' of the inner set 12 may be substantially equal to one another, and the outer diameters may be substantially equal to one another. The inner diameters of the fluid treatment elements 14" of the outer set 13 may be substantially equal to one another and to the outer diameter of fluid treatment elements 14' of the inner set 12, and the outer diameters of the fluid treatment elements 14" of the outer set 13 may be substantially equal to one another.

The volume of the fluid treatment elements 14', 14" may depend, for example, on factors such as the width of the ribbon and the radial dimension of the disk-shaped body. For some embodiments, all of the fluid treatment elements 14', 14" of the fluid treatment arrangement 10 may have the same volume. For some embodiments, the fluid treatment elements 14' of the inner set 12 may all have substantially the same volume and the fluid treatment elements 14" of the outer set 13 may all have substantially the same volume but a different volume, either larger or smaller, than the volume of the fluid treatment elements 14' of the inner set 12.

The inner set 12 of fluid treatment elements 14' may be axially positioned along the core assembly 11, for example, immediately circumjacent to and contacting the core assembly 11. The outer set 13 of fluid treatment elements 14" may be axially positioned along the core assembly 11 radially displaced from, e.g., radially outside of, the inner set 12 of fluid treatment elements 14'. The fluid treatment elements 14" of the outer set 13 may be axially aligned with or axially offset from the fluid treatment elements 14' of the inner set 12. Within both the inner and outer sets 12, 13, some of the fluid treatment elements may be axially positioned along the core assembly with the end surfaces of adjacent fluid treatment elements side-by-side in close proximity to, e.g., in contact with, one another along an interface between the adjacent elements. Further, some or all of the fluid treatment elements 14', 14" may be positioned along the core assembly 11 axially spaced from one another to define spaces 40, 41 between the end surfaces 21, 22 of adjacent fluid treatment elements. The distance between adjacent fluid treatment elements may define the width of each space 40, 41, and the widths of the spaces 40, 41 may be uniform or non-uniform within each set and/or from one set to another set. The spaces 40, 41 may radially extend between adjacent fluid treatment elements along at least about 85%, or at least about 90%, or about 100% of the radial dimension of the fluid treatment element. Further, many or all of the spaces 40, 41 may be substantially free of structure, for example, as disclosed in U.S. Provisional Application No. 60/907,068 entitled Fluid Treatment Elements and Fluid Treatment Arrangements with Spaces Between Fluid Treatment Elements and Methods for Making and Using Them, which listed Thomas Welch, Jr., Tanweer ul Haq, and Joseph Verschneider as an inventor and which was filed on Mar. 19, 2007, and the PCT International Application which claims priority based on this Provisional Application, both of which are incorporated by reference to support these and other features. Alternatively, some or all of the spaces may include, for example, may be occupied by, any of a variety of structures. Some structures may serve as spacers and/or supports and may be configured in any of numerous ways. For example, these structures may include rigid or flexible plates or grids that may have channels, ribs, or openings to guide fluid through the spaces or one or more layers of mesh or a mass of coarse fibers through which fluid may flow into or out of the spaces. Alternatively, these structures may include one or more posts that extend within the spaces, for example, as disclosed in U.S. Provisional Application No. 60/907,078 entitled Fluid Treatment Elements and Fluid Treatment Arrangements with Posts and/or Bands Between Fluid Treatment Elements and Methods for Making and Using Them, which listed Thomas Welch, Jr., Tanweer ul Haq, and Joseph Verschneider as an inventor and which was filed on Mar. 19, 2007, and the PCT International Application which claims priority based on this Provisional Application, both of which are incorporated by reference to support these and other features. Besides spacers and/or supports, other structures, including, for example, functional materials, may be located in the spaces, for example, as disclosed in the previously referenced U.S. Provisional Application No. 60/907,069 entitled Fluid Treatment Elements and Fluid Treatment Arrangements with Fluid Treatment Elements Having Different Fluid Treatment Characteristics and Methods for Making and Using Them and the PCT International Application which claims priority based on this Provisional Application.

The fluid treatment arrangement 10 may further comprise an inner surround 42 between the inner and outer sets 12, 13 of fluid treatment elements 14', 14" and an outer surround 43 around the outer set 13 of fluid treatment elements 14". The inner surround may be associated with some or all of the spaces between spaced fluid treatment elements and/or the interfaces between proximal fluid treatment elements and may serve to separate the spaces, interfaces, and/or rims of one set of elements from those of the other set of elements. The outer set 13 of fluid treatment elements 14" may be positioned along the core assembly 11 around the inner set 12 of fluid treatment elements 14' and the inner surround 42. For example, the outer set 13 of fluid treatment elements 14" may be immediately circumjacent to and contacting the inner surround 42 and/or the outer rims 23 of the fluid treatment elements 14' of the inner set 12. The outer surround may be associated with some or all of the spaces between spaced fluid treatment elements and/or the interfaces between proximal fluid treatment elements of the outer set and may serve to separate the spaces, interfaces, and/or outer rims of the fluid treatment elements of the outer set from the exterior of the outer fluid treatment elements, e.g., the region radially beyond the outer fluid treatment elements.

Each surround may be configured in a wide variety of ways, including, for example, as one or more components separate from but associated with the fluid treatment elements. One of many different examples of inner and outer surrounds 42, 43 may comprise a plurality of axially spaced inner bands 44 and outer bands 45, respectively. The inner bands 44 may be circumjacent to and seal some of the spaces and/or interfaces between the fluid treatment elements 14', 14" of the inner and/or outer sets 12, 13. For many embodiments, the inner bands 44 may bridge the outer ends of some of the spaces and/or interfaces and partially or completely cover the outer rims 23 of the adjacent inner fluid treatment elements 14' of the inner set 12. The inner bands 44 may also bridge the inner ends of some of the spaces and/or interfaces and partially or completely cover the inner rims 23a of the adjacent outer fluid treatment elements 14" of the outer set 13. The outer bands 45 may be circumjacent to and seal some of the spaces and/or interfaces between the fluid treatment elements 14" of the outer set 13, bridging the outer ends of some of the spaces and/or interfaces and partially or completely covering the outer rims 23 of the adjacent outer fluid treatment elements 14". Each surround 42, 43 may be impermeable and may be sealed to the fluid treatment elements 14', 14" in a variety of ways. For example, the inner and outer bands 44, 45 may comprise impermeable strips, e.g., impermeable polymeric strips, and may be bonded, e.g., adhesively bonded, solvent bonded, or heat bonded, to the outer rims 23 and/or inner rims 23a of the disk-shaped bodies 20 of the fluid treatment elements 14', 14". Alternatively, the bands may comprise an impermeable, settable bonding material such as a hot-melt adhesive, a polyurethane, or an epoxy, and may be bonded to the fluid treatment elements, for example, as disclosed in the previously referenced U.S. Provisional Application No. 60/907,078 entitled Fluid Treatment Elements and Fluid Treatment Arrangements with Posts and/or Bands Between Fluid Treatment Elements and Methods for Making and Using Them and the PCT International Application which claims priority based on this Provisional Application.

The surrounds, as well as the fluid treatment elements and the spaces between the fluid treatment elements of both sets, may be arranged in a variety of ways to guide fluid along the fluid treatment elements of the inner and outer sets between the interior of the core assembly and the exterior of the fluid treatment arrangement, e.g., the region radially beyond the fluid treatment arrangement. For example, for many embodiments, including the embodiment illustrated in FIG. 1, a fluid flow path 50 may be arranged to direct fluid from the exterior of the fluid treatment arrangement 10 through one or more of the fluid treatment elements 14" of the outer set 13 and then one or more of the fluid treatment elements 14' of the inner set 12 into and axially along the interior 15 of the core assembly 11. Some of the spaces between the fluid treatment elements 14" of the outer set 13, e.g., outer feed spaces 40, may fluidly communicate with the exterior of the fluid treatment arrangement 10, allowing fluid to flow along the fluid flow path 50 into the outer feed spaces 40. At the inner end of each outer feed space 40, the inner surround 42, e.g., one or more of the inner bands 44, may isolate the fluid from the inner spaces 40, 41, the interfaces, and/or the fluid treatment elements 14' of the inner set 12. The end surfaces 21 of the outer fluid treatment elements 14" facing the outer feed spaces 40 may then be feed or inflow surfaces, and the fluid may flow along the fluid flow path 50 from the feed spaces 40 into adjacent outer fluid treatment elements 14" via the feed surfaces 21. Other spaces between the fluid treatment elements 14" of the outer set 13, e.g., outer permeate spaces 41, may be fluidly isolated from the exterior of the fluid treatment arrangement 10. For example, the outer surround 43, e.g., one or more of the outer bands 45, may fluidly isolate the outer end of each outer permeate space 41 from the exterior of the fluid treatment arrangement 10. The end surfaces 22 of the outer fluid treatment elements 14" facing the outer permeate spaces 41 may then be permeate or outflow surfaces, and the fluid may exit the outer fluid treatment elements 14" via the permeate surfaces 22 and enter the outer permeate spaces 41.

Some of the spaces between the fluid treatment elements 14' of the inner set 12, e.g., inner feed spaces 40, may fluidly communicate with the outer permeate spaces 41. For example, the inner ends of the outer permeate spaces 41 may open directly into the outer ends of the inner feed spaces 40, allowing fluid to flow along the fluid flow path 50 from the outer permeate spaces 41 into the inner feed spaces 40. The inner end of each inner feed space 40 may be fluidly isolated, e.g., blocked by the core assembly 11. The end surfaces 21 of the inner fluid treatment elements 14' facing the inner feed spaces 40 may then be feed or inflow surfaces, and the fluid may flow along the fluid flow path 50 from the inner feed spaces 40 into the inner fluid treatment elements 14' via the feed surfaces 21. Other spaces between the fluid treatment elements 14' of the inner set 12, e.g., inner permeate spaces 41, may be fluidly isolated from the exterior of the inner fluid treatment elements 14', e.g., the region radially beyond the inner fluid treatment elements. For example, the inner surround 42, e.g., one or more of the inner bands 44, may fluidly isolate the outer end of each inner permeate space 41. The end surfaces of the inner fluid treatment elements 14' facing the inner permeate spaces 41 may then be permeate or outflow surfaces and the fluid may exit the inner fluid treatment elements 14' via the permeate surfaces 22 and enter the inner permeate spaces 41. The inner permeate spaces 41 may fluidly communicate with the openings 16 in the core assembly 11, allowing the fluid to flow along the fluid flow path 50 into and axially along the interior 15 of the core assembly 11.

Fluid treatment arrangements and elements may be made in any of several different ways. For example, methods of making a fluid treatment arrangement may comprise mounting first and second sets of spirally wound, disk-shaped fluid treatment elements along a hollow core assembly, including radially displacing the second set of fluid treatment elements from the inner set of fluid treatment elements. For example, at least two and as many as at least 10 or more, or at least 25 or more, or at least 50 or more, or at least 100 or more fluid treatment elements may be mounted along the core assembly in each set. The number of fluid treatment elements in one set may be less than, equal to, or greater than the number of fluid treatment elements in an adjacent set.

The fluid treatment elements of each set may be positioned along the core assembly in a variety of ways. For example, ribbons may be spirally wound in a plurality of windings around the core assembly to form the fluid treatment elements of the inner set and/or the outer set at different axial locations along the core assembly. For the fluid treatment elements 14' of the inner set 12, the ribbons 24 may be wound around and directly onto, for example, in contact with, the exterior of the core assembly 11 to form the disk-shaped bodies 20 of the inner fluid treatment elements 14'. Each ribbon 24 may be spirally wound in a sufficient number of windings to form a disk-shaped body 20 having any predetermined radial dimension. For many embodiments, all of the fluid treatment elements 14' of the inner set 12 may have substantially the same radial dimension and width. After the fluid treatment elements 14' of the inner set 12 have been formed, the inner surround 42 may be coupled to the inner fluid treatment elements 14'. For example, the inner bands 44 may be positioned around the permeate spaces 41 and/or interfaces of the inner set 12 and sealed to the adjacent inner fluid treatment elements 14'. For many embodiments, the inner bands 44 may be wrapped around the outer rims 23 of the inner fluid treatment elements 14' and bonded, e.g., adhesively bonded, solvent bonded, or heat bonded, to the outer rims 23, partially or completely covering the outer rims 23.

The ribbons 24 of the fluid treatment elements 14" of the outer set 13 may then be wound around the core assembly 11 by winding the ribbons 24 around and directly onto, e.g., in contact with, the inner surround 42 and/or the outer rims 23 of the inner fluid treatment elements 14'. Each ribbon 24 may be spirally wound in a sufficient number of windings to form a disk-shaped body 20 having any predetermined radial dimension. For many embodiments, all of the fluid treatment elements 14" of the outer set 13 may have substantially the same radial dimension and width. The number and width of the ribbons 24 and the radial dimension of the disk-shaped bodies 20 of the outer fluid treatment elements 14" may be substantially the same as or different from those of the inner fluid treatment elements 14'. Further, the ribbons 24 of the outer set 13 may be wound around the core assembly 11 axially aligned with or axially offset from the inner fluid treatment elements 14'. After the fluid treatment elements 14" of the outer set 13 have been formed, the outer surround 43 may be coupled to the outer fluid treatment elements 14". For example, the outer bands 45 may be positioned around the permeate spaces 41 and/or interfaces of the outer set 13 and sealed to the adjacent outer fluid treatment elements 14". For many embodiments, the outer bands 45 may be wrapped around the outer rims 23 of the outer fluid treatment elements 14" and bonded, e.g., adhesively bonded, solvent bonded, or heat bonded, to the outer rims 23, partially or completely covering the outer rims 23.

For each set of fluid treatment elements, the ribbons may be wound around the core assembly one at a time, several at a time, or all at the same time, e.g., either sequentially or simultaneously. The inner end region of the ribbon, e.g., the region defining the first one, two, or three windings, may be sufficiently sealed against the core assembly or the inner surround to prevent bypass of the fluid treatment element. For example, at least a portion of the inner end region may be fixed to the core assembly or the inner surround by heat bonding, adhesively bonding, or solvent bonding the portion to the core assembly or the inner surround. Alternatively, the inner end region may not be bonded but may, for example, be compressively fit against the core assembly or the inner surround by tightly winding the initial windings around the core assembly. Further, the inner end region may have a tapered thickness or may be sufficiently tightly wound that no step is formed at the transition between the end of the first winding and the beginning of the second winding.

Any or all of the ribbons of each set may be spirally wound to form at least one uneven end surface on a disk-shaped body. For example, an uneven surface may be formed by spirally winding a ribbon having a pinked side edge and/or by spirally winding a ribbon with a side edge of one winding overlapping the side edge of another winding, for example, as disclosed in the previously referenced U.S. Provisional Application No. 60/907,065 entitled Fluid Treatment Elements and Fluid Treatment Arrangement with Fluid Treatment Elements Having Uneven Surfaces and Methods for Making and Using Them and the PCT International Application which claims priority based on this Provisional Application. Alternatively, the ribbons may be spirally wound to form two even end surfaces on each disk-shaped body.

For each set of fluid treatment elements, each ribbon may be spirally wound in a plurality of windings under tension to form a fluid treatment element of any desired radial dimension. The tension may be constant or may vary with increasing radial dimension of the fluid treatment element, and the tension may be empirically selected based on many factors. For example, a maximum tension at which the ribbon detrimentally elongates, e.g., the tension at which the fluid treatment medium unduly stretches or begins pulling apart, may be determined. The ribbon may then be spirally wound using a tension less than the maximum tension, for example, no greater than about 80% or no greater than about 65% or no greater than about 50% of this maximum tension. Further, the ribbon may be spirally wound using a tension which provides similar compression, e.g., substantially uniform compression, of the fluid treatment medium from one winding to the next along most or all of the radial dimension of the fluid treatment element. By providing similar compression from one winding to the next, the fluid treatment element may more evenly treat the fluid flowing edgewise through the plurality of windings of the fluid treatment medium. For example, if the fluid treatment medium comprises a filter medium, the fluid treatment element may be more uniformly loaded along the radial dimension of the element, increasing the dirt capacity and/or the service life of the element. In addition, the ribbon may be spirally wound with sufficient tension to inhibit or prevent the flow of fluid laterally between adjacent surfaces of adjacent windings and adjacent layers of the ribbon. For example, the ribbon may be spirally wound with sufficient tension that substantially no fluid laterally passes between the adjacent surfaces and adjacent layers or with sufficient tension that any fluid pathway laterally between the adjacent surfaces and adjacent layers of the ribbon has a permeability and/or a removal rating which is not substantially greater or coarser than the permeability and/or removal rating of the fluid pathway edgewise through the fluid treatment medium. The ribbon may also be wound with sufficient tension to form a substantially self-supporting fluid treatment element having a stable, firm disk-shaped body. For example, the ribbon may be wound with sufficient tension to hold adjacent windings and adjacent layers against each other tightly enough to prevent lateral slippage and/or radial separation of the adjacent windings and adjacent layers at the differential pressures encountered by the fluid treatment element.

After each ribbon has been spirally wound to a desired radial dimension, the outer end region of the ribbon may be held in place in any of numerous ways. For example, the outer end region may be bonded to the adjacent winding for example, by heat bonding, adhesive bonding, or solvent bonding. Alternatively or additionally, the outer end region of the ribbon may be staked to other windings. For example, a hot, metal pin may be inserted generally radially through the outer end region of the ribbon and the other windings, melting the portions of the ribbon that contact the pin. When the pin is withdrawn, the molten portions may solidify with one another, forming a generally radial stake which holds the outer end region, including any multiple layers of the ribbon, and the other windings in place. Alternatively or additionally, a hollow needle, which may or may not be hot, may be inserted generally radially through the outer end region and other windings or in the space between adjacent windings. A liquid settable bonding composition or material, including, for example, a polyurethane, an epoxy, or a hot melt adhesive, may be injected into the windings as the needle is withdrawn, forming a generally radial stake which holds the outer end region and the windings in place. As yet another alternative, a stake, for example, in the form of a weld bead or a bead of hot-melt adhesive, may be drawn along one or both side edges of the outer end region of the ribbon and the other windings.

For each set of fluid treatment elements, the stability of a spirally wound fluid treatment element may be further enhanced by staking much or all of the disk-shaped body. For example, generally radially extending stakes may be formed through most or substantially all of the windings and/or at various angularly-spaced positions around the disk-shaped body. Similarly, stakes may be applied along one or both end surfaces of the fluid treatment element and/or at various angularly-spaced positions around each end surface, including the end surfaces at the interface between proximal fluid treatment elements. Each stake may extend mostly or completely through or along the fluid treatment element, e.g., to the core assembly or the inner surround, fixing the fluid treatment to the core assembly or the inner surround.

The stability of a spirally wound fluid treatment element may also be enhanced by bonding adjacent windings, and/or adjacent layers of the ribbon, to one another continuously or intermittently along the length of the spirally wound ribbon. Adjacent windings and/or layers may be bonded in a variety of ways. For example, the ribbon may include a bonding layer, as previously described. The bonding layer may comprise an adhesive which bonds adjacent windings and/or layers as the ribbon is spirally wound. Alternatively, the bonding layer may be activated by applying a solvent or heat to the fluid treatment element after the element is formed. As yet another alternative, a hot melt adhesive or a heat bond may be applied, for example, intermittently, between adjacent windings and/or layers as the ribbon is spirally wound.

The fluid treatment elements of each set may be positioned along the core assembly with spaces between some, many or all of the elements. Before, while, or after the fluid treatment elements are positioned along the core assembly, various structures may be arranged along the core assembly in, or at the locations corresponding to, some or all of the spaces between the elements. For example, meshes, fibrous masses, plates, grids, and/or posts may be positioned in some or all of the spaces between the elements.

After the fluid treatment arrangements are formed, they may be contained within a wide variety of housings to provide fluid treatment assemblies. The fluid treatment assembly may comprise a housing containing only a single fluid treatment arrangement or a housing containing multiple fluid treatment arrangements arranged serially and/or in parallel within the housing. For example, the housing may include one or more tube sheets and multiple fluid treatment arrangements may be associated with the tube sheets. The housing may permanently contain the fluid treatment arrangement, e.g., forming a disposable fluid treatment assembly, or the housing may removably contain the fluid treatment arrangement, allowing a used fluid treatment arrangement to be replaced by a new fluid treatment arrangement in a reusable housing.

The housing may be formed from any impermeable material, e.g., a metallic material or a polymeric material, which is compatible with the process parameters, e.g., the pressure and temperature and the chemical composition of the fluid. The housing may have two or more principle ports, e.g., a process or feed fluid inlet port and a filtrate or permeate outlet port. The housing may define a fluid flow path between the ports, and the fluid treatment arrangement may be positioned in the housing with the first and second fluid treatment elements disposed in series in the fluid flow path. The ports may be situated on the housing in any of numerous configurations, including an in-line configuration, a T-type configuration, or an L-type configuration, and the ports may comprise any of a wide variety of fittings. The housing may further include additional ports, including, for example, a retentate or concentrate outlet port and one or more ports associated with draining, venting, or cleaning, e.g., backwashing.

Figure 7:
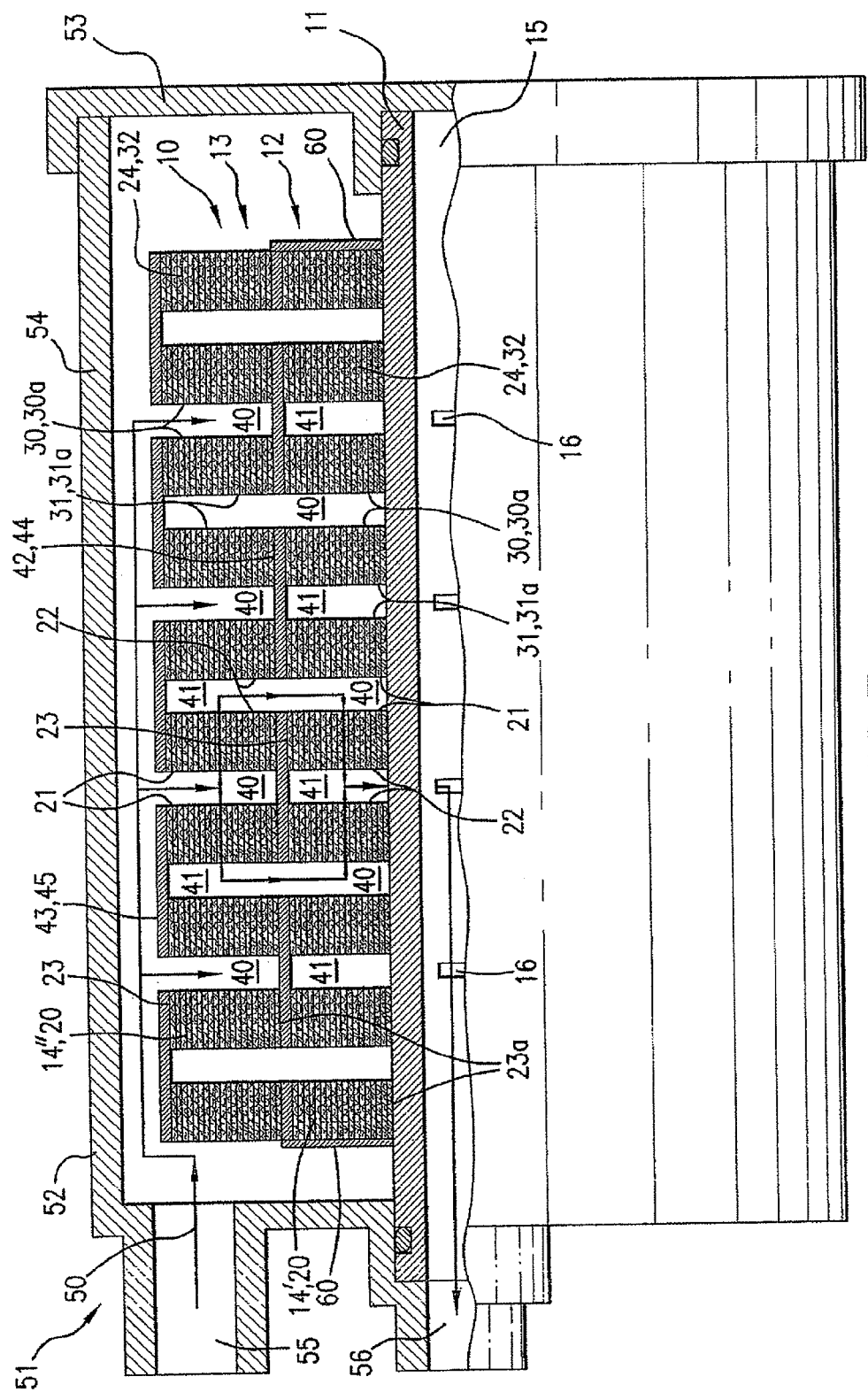
FIG. 7 is a quarter sectioned view of a fluid treatment assembly including a fluid treatment arrangement.

One of many examples of a fluid treatment assembly 51 and a housing 52 containing at least one fluid treatment arrangement 10 is shown in FIG. 7, but fluid treatment assemblies and housings are not limited to the features illustrated in FIG. 7. The housing 52 may include a cover 53 and a shell 54. The cover 53 may be permanently or removably mounted to the shell 54 at one end of the shell 54. The other end of the shell 54 may have a feed inlet port 55 and a permeate outlet port 56. The illustrated embodiment of the fluid treatment assembly 51 has only two ports 55, 56, and they are located on one end of the housing 52. Other embodiments may include more than two ports, and the ports may be located anywhere along the housing, e.g., at both ends and/or in the side of the housing.

The fluid treatment arrangement 10 may be sealed within the housing 52 across a fluid flow path 50 between the feed inlet port 55 and the permeate outlet port 56 with the shell 54 surrounding the fluid treatment elements 14', 14" of the first and second sets 12, 13. A portion of the fluid flow path 50 between the inlet port 55 and the outlet port 56 includes fluid flow pathways which extend generally edgewise through the fluid treatment media of the fluid treatment elements 14', 14". The fluid flow path 50 extends between the inlet port 55 and the outlet port 56 through a disk-shaped body 20 of at least one fluid treatment element 14" of the outer set 13 and at least one fluid treatment element 14" of the inner set 12. The fluid treatment arrangement 10 may be sealed in the housing 52 in any of numerous ways. For example, one end of the hollow core assembly 11 may be blindly sealed against the cover 53. The opposite end of the hollow core assembly 11 may be open and sealed to the shell 54 at the permeate outlet port 56, allowing fluid communication between the interior 15 of the core assembly 11 and the permeate outlet port 56. The outwardly facing end surface of each endmost fluid treatment element 14' of the inner set 12 may be sealed to prevent bypass of the feed fluid around the outer set of fluid treatment elements 14". For example, a seal 60 such as a sealing disk or plate may be bonded to the outwardly facing end surfaces or a settable material such as a hot melt adhesive, a polyurethane, or an epoxy may be applied to the outwardly facing surfaces to seal them.

Fluids may be treated in a wide variety of ways by fluid treatment assemblies, arrangements, and elements embodying the invention. In one mode of operation, a feed fluid may be treated by directing fluid between the exterior of a fluid treatment arrangement and the interior of the core assembly, including passing the fluid generally edgewise through windings of a permeable fluid treatment medium of a first fluid treatment element and passing the fluid generally edgewise through windings of a permeable fluid treatment medium of a second fluid treatment element radially displaced from the first fluid treatment element.

For example, the feed fluid may be directed through the fluid treatment assembly 51 along the fluid flow path 50, where the fluid is treated by the fluid treatment elements 14', 14" of the inner and outer sets 12, 13. The feed fluid may be directed inside-out through the fluid treatment arrangement from the interior of the core assembly to the exterior of the fluid treatment elements of the outer set. However, in the illustrated fluid treatment assembly 51, the feed fluid may be directed outside-in through the fluid treatment arrangement 10 from the exterior of the outer fluid treatment elements 14" to the interior 15 of the core assembly 11. The feed fluid may enter the housing 52 through the feed inlet port 55 and follow the fluid flow path 50 to the permeate outlet port 56. From the feed inlet port 55, the feed fluid may flow generally axially along the housing 52 between the exterior of the fluid treatment elements 14" of the outer set 13 and the interior of the shell 54. The feed fluid then flows generally radially inwardly into the feed spaces 40 between the feed surfaces 21 of the outer fluid treatment elements 14" and along any structures which may be in the outer feed spaces 40. Further radial flow of the fluid beyond the inner ends of the outer feed spaces 40 may be blocked by the inner surround 42. To prevent fluid flowing from the outer feed spaces 40 into the outer rims 23 of the fluid treatment elements 14' of the inner set 12, thereby bypassing the fluid treatment elements 14" of the outer set 13, the inner surround 42 may completely cover the outer rims 23 of the inner fluid treatment elements 14'.

From the outer feed spaces 40, the feed fluid may flow along the fluid flow path 50 generally axially through the adjacent fluid treatment elements 14" of the outer set 13 into the outer permeate spaces 41. The fluid may flow into the feed surface 21, including, for example, the plurality of windings of one side edge 30, 30a; 31, 31a of the ribbon 24 and the fluid treatment medium 32, of each outer fluid treatment element 14" adjacent to an outer feed space 40. From the feed surface 21, the fluid may flow generally edgewise through the permeable fluid treatment medium 32 of each winding of each outer element 14". The fluid may also flow from the fluid treatment medium 32 of one winding radially into and then laterally along the medium 32 of one or more adjacent or nearby windings of the element 14". As the fluid passes through the fluid treatment medium 32 of each outer fluid treatment element 14", the fluid is treated in accordance with the fluid treatment characteristic of the medium 32. The treated fluid emerges from the outer fluid treatment elements 14" via the permeate surfaces 22, including, for example, the plurality of windings of the other side edge 31, 31a; 30, 30a of the ribbon 24 and fluid treatment medium 32. From the permeate spaces 22 of the outer fluid treatment elements 14" the fluid flows into the outer permeate spaces 41, which are isolated from the exterior of the fluid treatment arrangement 10 by the outer surround 43, e.g., the outer bands 45. From the outer permeate spaces 41, the fluid may flow radially inwardly along the fluid flow path 50 into the inner feed spaces 40 between the fluid treatment elements 14' of the inner set 12 that fluidly communicate with the outer permeate spaces 41. Further radial flow of the fluid beyond the inner end of each inner feed space 40 may be blocked by the wall of the core assembly 11.

From the inner feed spaces 40, the fluid may flow along the fluid flow path 50 generally axially through the adjacent fluid treatment elements 14' of the inner set 12 into the inner permeate spaces 41. The fluid may flow into the feed surface 21, including, for example, the plurality of windings of one side edge 30, 30a; 31, 31a of the ribbon 24 and the fluid treatment medium 32, of each inner fluid treatment element 14' adjacent to an inner feed space 40. From the feed surface 21, the fluid may flow generally edgewise through the permeable fluid treatment medium 32 of each winding of each inner element 14'. The fluid may also flow from the fluid treatment medium 32 of one winding radially into and then laterally along the medium 32 of one or more adjacent or nearby windings of the element 14'. As the fluid passes through the fluid treatment medium 32 of each inner fluid treatment element 14', the fluid is treated in accordance with the fluid treatment characteristic of the medium 32. The treated fluid emerges from the inner fluid treatment elements 14' via the permeate surfaces 22, including, for example, the plurality of windings of the other side edge 31, 31a; 30, 30a of the ribbon 24 and fluid treatment medium 32. From the permeate surfaces 22 of the inner fluid treatment elements 14' the fluid flows into the inner permeate spaces 41, which are isolated from the outer spaces 40, 41 and the outer fluid treatment elements 14" by the inner surround 42, e.g., the inner bands 44. From the inner permeate spaces 41, the fluid may flow radially inwardly along the fluid flow path 50 through the openings 16 in the core assembly 11 and then axially along the interior 15 of the core assembly 11 to the permeate outlet port 56 of the housing 52.

Many advantages are associated with fluid treatment assemblies, arrangements, elements, and methods embodying one or more aspects of the invention. For example, by providing first and second radially displaced sets of fluid treatment elements, the fluid may flow through at least two fluid treatment elements, e.g., an element of the first set and an element of the second set, as the fluid passes between the exterior of the fluid treatment arrangement and the interior of the core assembly. Treatment of the fluid may thus be significantly enhanced. Further, by radially displacing the first and second sets of fluid treatment elements along the core assembly, axially shorter fluid treatment arrangements with larger diameters may be formed. Shorter, larger diameter fluid treatment elements may more efficiently use the space within many housings.

In addition, spirally winding separate ribbons to separately form each of the plurality of fluid treatment elements of the first and second sets facilitates manufacturing different configurations of fluid treatment arrangements and elements. The radial dimension of each element of each set may be easily varied by winding more or less of the ribbon around the core assembly; the number of fluid treatment elements provided along the core assembly in each set can be easily varied by winding more or fewer ribbons around the core assembly; and the location of the fluid treatment elements along the core assembly in each set can be easily varied by simply adjusting the spacing between the ribbons being wound around the core assembly. Further, the ribbons of each set may be spirally wound around the core assembly very quickly, speeding manufacture. Using a plurality of separate, narrow ribbons instead of, for example, a single, wide sheet with slots or other through holes in the sheet may then significantly enhance the flexibility and efficiency of manufacture, allowing fluid treatment arrangements with various sets of elements, numbers of elements, and spacings between elements to be made without having to change out sheets of different widths or different through hole configurations. In addition, if a defect such as a hole or tear in the permeable fluid treatment medium occurs during manufacture, only the defective ribbon may be replaced rather than an entire sheet, allowing for faster and more efficient production.

While various aspects of the invention have been previously described and/or illustrated with respect to several embodiments, the invention is not limited to these embodiments. For instance, one or more features of these embodiments may be eliminated without departing from the scope of the invention. For many embodiments, the fluid treatment arrangement 10 may include a seal 60 along the outwardly facing surfaces of the endmost fluid treatment elements 14' of the inner set 12. Alternatively, for some embodiments, these seals may be eliminated, exposing these outwardly facing surfaces to the feed fluid. A portion of the feed fluid may then bypass the fluid treatment elements of the outer set, passing directly through the endmost fluid treatment elements of the inner set to the interior of the core assembly.

Further, one or more features of an embodiment may be modified, or one or more features of any embodiment may be combined with one or more features of other embodiments, without departing from the scope of the invention. For example, the surrounds may be configured in many other ways. Either surround may further include additional bands which encircle the outer ends of the feed spaces, e.g., bridging the feed spaces and covering a portion or all of the outer rims of the adjacent fluid treatment elements. These bands may have openings, e.g., perforations, that allow the feed spaces to fluidly communicate through these bands with the exterior of the outer fluid treatment elements or with the outer permeate spaces. Alternatively, each surround may comprise a flexible, impermeable sleeve that is fitted closely around or heat-shrunk around the outer rims of all of the fluid treatment elements or an impermeable helical wrap that is helically wrapped around the outer rims of all of the fluid treatment elements. Openings, e.g., perforations or slits, may be formed in the surround to allow fluid communication with feed spaces.

As another example, each surround may comprise a more rigid structure to provide additional support at the outer rims of the inner or outer fluid treatment elements. For example, the surround may comprise semi-cylindrical sections which may be fitted around a set of the fluid treatment elements and joined to one another to form a more rigid cage. The outer rims of the fluid treatment elements may be sealed against the cage in a variety of ways, sealing the outer ends of the permeate spaces between the fluid treatment elements. For example, the outer rims may be adhesively bonded or heat bonded to the cage. Alternatively or additionally, the outer rims may be sealed against the cage by a tight mechanical fit between them. The cage may include openings that allow the feed spaces to fluidly communicate with the exterior of the fluid treatment arrangement or the outer permeate spaces. One example of a more rigid surround is disclosed in previously referenced U.S. Provisional Application No. 60/907,065 entitled Fluid Treatment Elements and Fluid Treatment Arrangement with Fluid Treatment Elements Having Uneven Surfaces and Methods for Making and Using Them and the PCT International Application which claims priority based on this Provisional Application.

Figure 8:
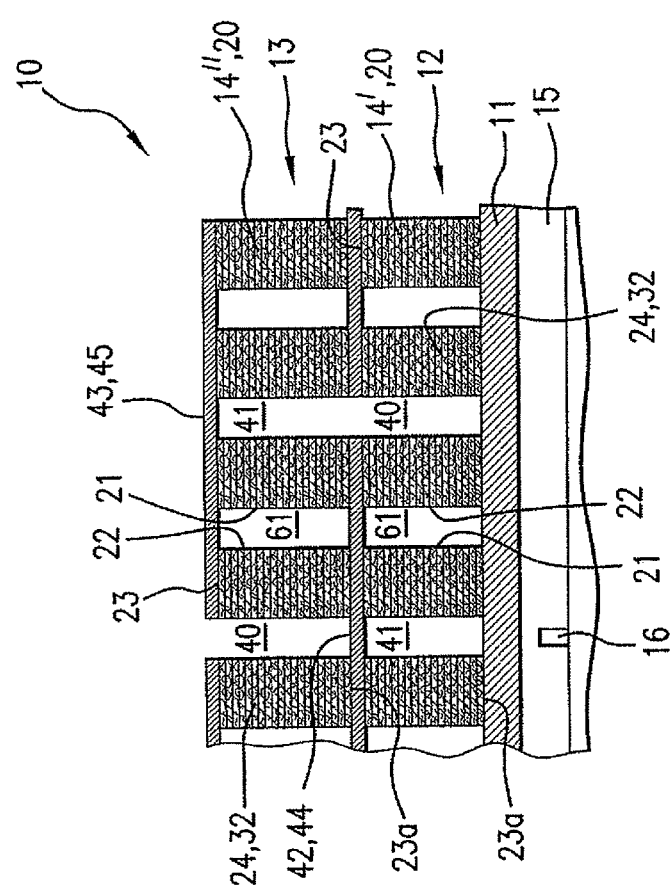
FIG. 8 is a quarter sectioned view of a portion of another fluid treatment arrangement.

As another example, some of the spaces between adjacent fluid treatment elements of either set may be arranged to be more fluidly isolated. A portion of a fluid treatment arrangement 10, including a core assembly 11, some of the fluid treatment elements 14' of the inner set 12, and some of the fluid treatment elements 14" of the outer set 13, is shown in FIG. 8. Each fluid treatment element 14', 14" may comprise a spirally wound ribbon 24 having a strip of a fluid treatment medium 32. The fluid treatment elements 14', 14", including the spirally wound disk-shaped bodies 20, and the core assembly 11 illustrated in FIG. 8 may be similar to those previously described, but neither the fluid treatment arrangement, the fluid treatment elements, the core assembly, nor the surrounds are limited to the features shown in FIG. 8. The fluid treatment arrangement 10 may include at least one intermediate or intervening space 61 positioned axially between a feed space 40 and a permeate space 41 in the inner set 12 and/or the outer set 13 of fluid treatment elements 14', 14". The intermediate space 61 may face a permeate surface 22 of one adjacent fluid treatment element and a feed surface 21 of the other adjacent fluid treatment element. The intermediate space 61 in the outer set 13 may be fluidly isolated from the exterior of the outer fluid treatment elements 14" by the outer surround 43 and may be fluidly isolated from the spaces, interfaces, and/or fluid treatment elements 14' of the inner set 12 by the inner surround 42. For example, an outer band 45 may bridge the outer ends of both the outer intermediate space 61 and an outer permeate space 41, partially or completely covering the outer rims 23 of all three adjacent outer fluid treatment elements 14". An inner band 44 may bridge the inner ends of the outer intermediate space 61 and the outer feed space 40, partially or completely covering the inner rims 23a of all three adjacent outer fluid treatment elements 14". Consequently, the outer intermediate space 61 may be fluidly isolated at both the outer and inner ends, the outer feed space 40 on one side of the outer intermediate space 61 may be fluidly isolated only at the inner end, and the outer permeate space 41 on the other side of the intermediate space 61 may be fluidly isolated only at the outer end.

The intermediate space 61 in the inner set 12 may be fluidly isolated from the exterior of the inner fluid treatment elements 14', including the spaces, interfaces, and/or fluid treatment elements 14" of the outer set 13, by the inner surround 42 and may be isolated from the interior 15 of the core assembly 11 by solid wall portions of the core assembly 11 that have no openings. For example, the inner band 44 may also bridge the outer ends of an inner intermediate space 61 and an inner permeate space 41, partially or completely covering the outer rims 23 of the fluid treatment elements 14' of the inner set 12. Solid wall portions of the core assembly 11 may block off the inner ends of the inner intermediate space 61 and an inner feed space 40, but one or more openings 16 in the core assembly 11 may allow the inner end of the inner permeate space 41 to fluidly communicate with the interior 15 of the core assembly 11. Any of the spaces 40, 41, 61 in either set 12, 13 may be substantially free of structure or may include structures such as spacers, supports, and/or functional materials. Feed fluid may, for example, flow generally radially into the outer feed space 40 and generally axially through the adjacent outer fluid treatment element 14", the outer intermediate space 61, and the next adjacent outer fluid treatment element 14" into the outer permeate space 41. The fluid may also flow generally radially from the outer permeate space 41 into an inner feed space 40 and generally axially through the adjacent inner fluid treatment element 14', the inner intermediate space 61, and the next adjacent inner fluid treatment element 14' into the inner permeate space 41. From the inner permeate space 41, the fluid flows generally radially into the interior 15 of the core assembly 11 through the openings 16 and axially along the interior 15 of the core assembly 11.

As yet another example, fluid treatment elements of the inner set and/or the outer set may be mounted along the core assembly by sliding preformed fluid treatment elements generally axially along the core assembly. For example, ribbons may be spirally wound in a plurality of windings to a desired radial dimension around separate central hubs, rather than around the core assembly, to form a fluid treatment element. The preformed inner fluid treatment elements may have inner diameters similar to the outer diameter of the core assembly and may be slid axially, with or without the hubs, along the core assembly to the desired locations and fixed in place. The inner surround may then be applied to the inner set of fluid treatment elements. The preformed outer fluid treatment elements thus formed may have inner diameters similar to the outer diameters of the inner fluid treatment elements and/or the inner surround and may be slid axially, with or without the hubs, along the core assembly around the inner surround to the desired locations and fixed in place. The outer surround may then be applied to the outer set of fluid treatment elements.

Further, embodiments having different features may nonetheless be within the scope of the invention. For example, ribbons may be spirally wound around separate hubs to preform inner fluid treatment elements. Each hub may comprise a section of the core assembly, and the hub sections of adjacent elements may be connected to one another to form the hollow core assembly mounted to the inner fluid treatment elements. The hub sections may be mechanically coupled to one another and/or bonded to one another, and some of the hub sections may include openings which allow fluid communication with the interior of the core assembly. The inner surround may then be applied to the inner set of fluid treatment elements, and the fluid treatment elements of the outer set may be mounted along the core assembly around the inner surround and sealed to the inner surround. For example, the ribbons of the outer fluid treatment elements may be spirally wound around the inner surround, or preformed outer fluid treatment elements may be axially slid along the inner surround and fixed in place. The outer surround may then be applied to the outer set of fluid treatment elements.

As another example, first and second sheet assemblies may each comprise a sheet of a permeable fluid treatment medium as the sole component or as one layer of a multilayer composite, e.g., similar to the multilayer composite of the ribbon. Each sheet may be spirally wound in a plurality of windings to form a roll having a desired radial dimension, including desired inner and outer diameters. Sections having a desired width may then be cut, e.g., sliced, from the rolls of the first and second sheets to preform inner and outer fluid treatment elements, respectively. The preformed first and second fluid treatment elements may then be mounted along the core assembly along with the inner and outer surrounds, as previously described.

Figure 9:
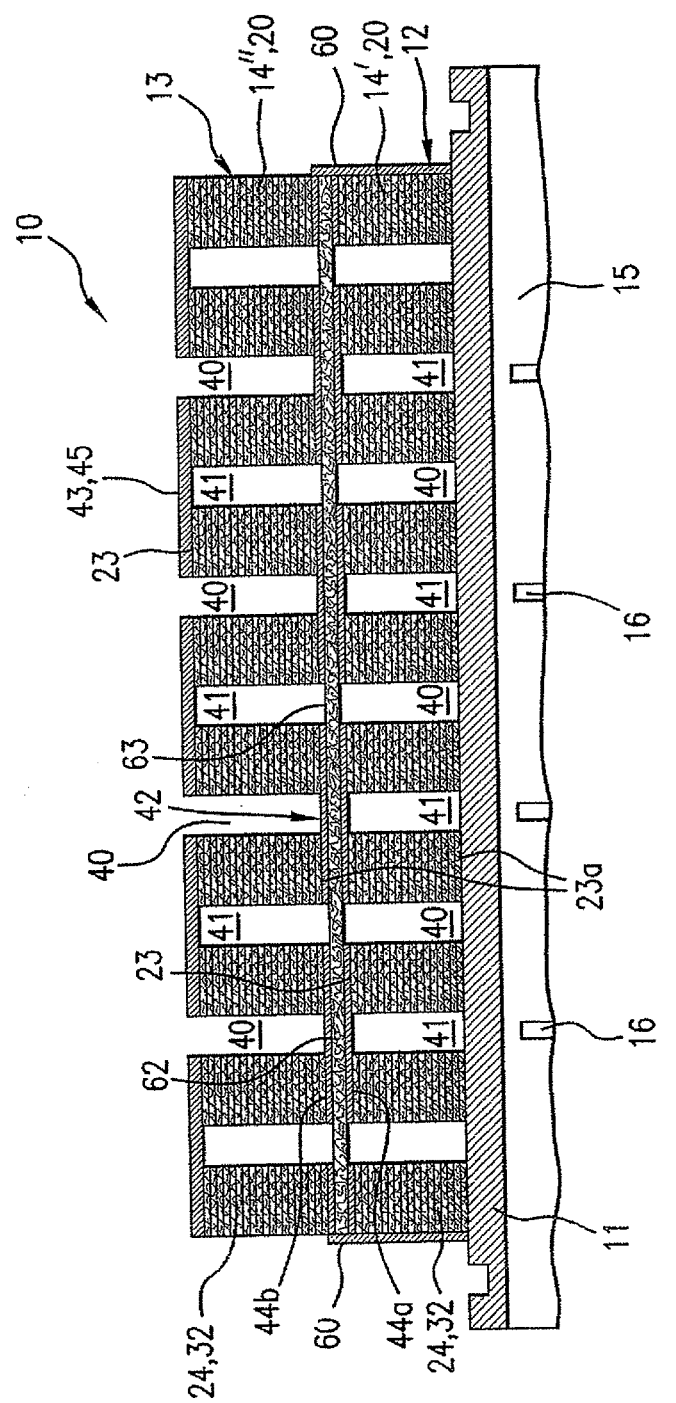
FIG. 9 is a quarter sectioned view of a portion of another fluid treatment arrangement.

As another example, a fluid treatment arrangement may include a flow distributor to distribute fluid flow from each permeate space of one set of fluid treatment elements to a plurality, e.g., some, most, or all, of the feed spaces of an adjacent set of fluid treatment elements. For example, a portion of a fluid treatment arrangement which includes an inner set 12 of fluid treatment elements 14', an outer set 13 of fluid treatment elements 14", an inner surround 42 and a flow distributor 62 between them is shown in FIG. 9. Each fluid treatment element 14', 14" may comprise a ribbon 24 having a strip of a fluid treatment medium 32. The inner and outer fluid treatment elements 14', 14", including the spirally wound disk-shaped bodies 20, may be similar to those previously described. The inner surround 42 may, for example, comprise first and second sets of inner bands 44a, 44b. The first set of inner bands 44a may bridge the outer ends of the permeate spaces 41 and/or interfaces between the fluid treatment elements 14' of the inner set 12, sealing the outer ends of the inner permeate spaces 41 or interfaces. The first set of inner bands 44a may also partially or completely extend across and cover the outer rims 23 of the inner fluid treatment elements 14' adjacent to the inner permeate spaces 41 or interfaces. The second set of inner bands 44b may bridge the inner ends of the feed spaces 40 and/or the interfaces between the fluid treatment elements 14" of the outer set 13, sealing the inner ends of the outer feed spaces 40 or interfaces. The second set of inner bands 44b may also partially or completely extend across and cover the inner rims 23a of the outer fluid treatment elements 14" adjacent to the outer feed spaces 40 or interfaces.

The flow distributor 62 may be arranged with the inner surround 42 in any manner which provides fluid communication between at least one permeate space, for example, a permeate space 41 of the outer set 13 of fluid treatment elements 14", and a plurality of feed spaces, for example, a plurality of feed spaces 40, e.g., two, three, four, five, or more feed spaces, even all of the feed spaces, between the inner set 12 of fluid treatment elements 14'. The flow distributor may be configured in a variety of ways to provide this fluid communication. For example, the flow distributor 62 may comprise a sheet 63 of coarsely porous material wrapped around some, most or all of the inner fluid treatment elements 14' between the first and second sets of inner bands 44a, 44b of the inner surround 42. The coarsely porous material may comprise, for example, a non-woven fibrous material, e.g., a non-woven sheet of glass or polymeric fibers, or a mesh, e.g., a biplanar, extruded and/or expanded polymeric mesh. The inner end of each outer permeate space 41 may open onto the flow distributor 62, and the outer ends of a plurality, e.g., all, of the inner feed spaces 40 may open onto the flow distributor 62. Each outer permeate space 41 may fluidly communicate with one or more, e.g., all, of the axially displaced inner feed spaces 40 via the flow distributor 62, e.g., the sheet 63 of coarsely porous material.

To position the sheet 63 of coarsely porous material between the inner and outer sets 12, 13 of fluid treatment elements 14', 14", the inner fluid treatment elements 14', may first be mounted along the core assembly 11, for example, as previously described. For many embodiments, the ribbons 24 may be spirally wound around the core assembly 11 to form the inner fluid treatment elements 14'. The first set of inner bands 44a may then be applied to the inner permeate spaces 41 and the inner fluid treatment elements 14'. Next, the sheet 63 of coarsely porous material may be wrapped around the inner fluid treatment elements 14' and the first set of inner bands 44a in one or more windings. The width of the sheet 63 may be sufficient to span all of the feed spaces 40 between the inner fluid treatment elements 14'. Alternatively, the width of the sheet may be sufficient to span fewer than all of the inner feed spaces, and multiple narrower sheets may be wrapped circumferentially around the inner fluid treatment elements and the first set of inner bands or a single narrower sheet may be helically wrapped around the inner fluid treatment elements and the first set of inner bands. As another alternative, a sleeve of coarsely porous material may be axially slid along the first set of inner bands and the inner fluid treatment elements. After the flow distributor 62 is in place, the second set of inner bands 44b may be positioned along the flow distributor 62 at locations corresponding to the inner ends of the outer feed spaces 40 and the inner rims 23a of the fluid treatment elements 14" of the outer set 13. For example, the second set of inner bands 44b may be wrapped around the sheet 63 of coarsely porous material at the corresponding locations. The outer fluid treatment elements 14" may then be mounted along the core assembly 11 over the second set of inner bands 44b and sealed to the second set of inner bands 44b by a bond or a tight compressive fit. For many embodiments, the ribbons 24 may be spirally wound around the second set of inner bands 44b of the inner surround 42 to form the outer fluid treatment elements 14". An outer surround 43 may then be applied to the outer ends of the outer permeate spaces 41 and the outer rims 23 of the outer fluid treatment elements 14".

Methods for treating fluid with a fluid treatment arrangement having a flow distributor may be similar to the treatment methods previously described. For example, feed fluid may be passed along a flow path generally radially inwardly into the feed spaces 40 between the fluid treatment elements 14" of the outer set 13, further radial flow being blocked by the second set of inner bands 44b. The fluid may then flow along the flow path generally axially through the adjacent outer fluid treatment elements 14" into the outer permeate spaces 41. From each outer permeate space 41, the fluid may flow along the flow path radially through or axially along the flow distributor 62, e.g., the sheet 63 of coarsely porous material, to the plurality, e.g., all, of the inner feed spaces 40. By distributing fluid flow to several inner feed spaces 40 from each outer permeate space 41, the pressure drop through the fluid treatment arrangement may be further reduced. As fluid flows along the flow distributor 62, fluid flow between the flow distributor 62 and the inner permeate spaces 41 may be blocked by the inner surround 42, e.g., the first set of inner bands 44a. Further, fluid flow out the axial ends of the flow distributor 62 may be blocked, for example, by the seal 60 at the endmost fluid treatment elements 14' of the first set 12. For many embodiments, a sealant, such as a hot-melt adhesive, an epoxy, or a polyurethane, may be applied to the axial ends of the flow distributor 62, e.g., the sheet 63 of coarsely porous material, to prevent flow into or out of the axial ends of the flow distributor 62. From the inner feed spaces 40, the fluid may flow along the flow path generally axially through the adjacent fluid treatment elements 14' of the inner set 12 into the inner permeate spaces 41. From the inner permeate spaces 41, the fluid may flow along the flow path radially into the interior 15 of the core assembly 11 through the openings 16 in the core assembly 11 and then axially along the interior 15 of the core assembly 11.

Flow distributors may be configured very differently. For some embodiments, the flow distributor and the inner surround may be combined in a single structure. For example, the flow distributor and the inner surround may be combined in a single double-walled cage. Inner and outer coaxial walls may define a flow space between them, the outer wall having openings at the outer permeate spaces and the inner wall having openings at the inner feed spaces. Further, fluid treatment arrangements having flow distributors may alternatively be configured for fluid flow from the interior of the core assembly to the exterior of the fluid treatment arrangement. For these embodiments, a flow distributor may be arranged between the inner and outer sets of fluid treatment elements with the inner permeate spaces and the outer feed spaces fluidly communicating with the flow distributor. In addition, fluid treatment arrangements having a flow distributor may be permanently or removably installed in a housing to form a fluid treatment assembly, similar to the fluid treatment assembly previously described.

Figure 10:
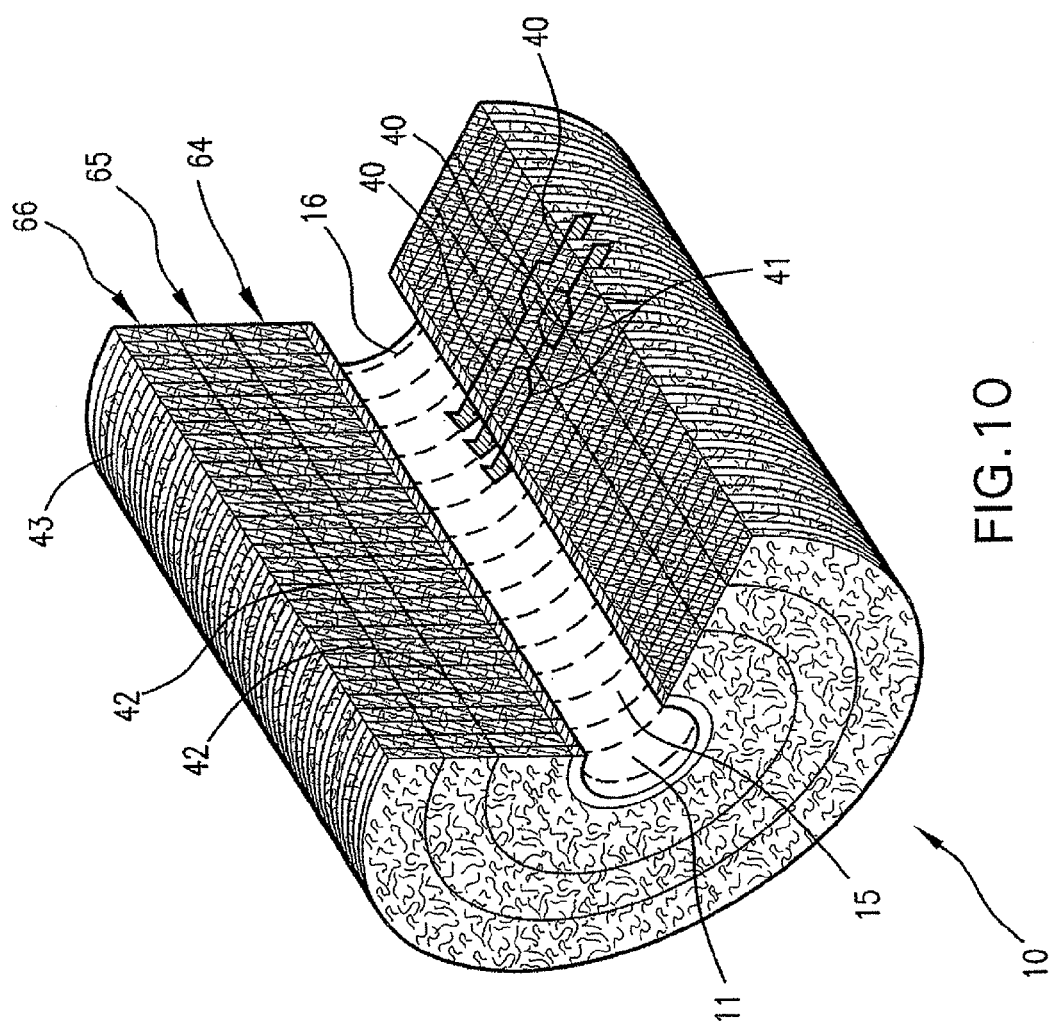
FIG. 10 is a quarter sectioned oblique view of another fluid treatment arrangement.

As yet another example, fluid treatment arrangements may have more than two radially displaced sets of fluid treatment elements. For example, as shown in FIG. 10, a fluid treatment arrangement 10 may have three sets 64, 65, 66 of radially displaced fluid treatment elements mounted along a core assembly 11. The fluid treatment elements of each set may comprise a ribbon having a strip of a fluid treatment medium which is spirally wound to form a disk-shaped body. Spaces, e.g., feed spaces 40, permeate spaces 41, and intermediate spaces, may be located between adjacent fluid treatment elements within each set 64, 65, 66, as previously described for the inner and outer sets 12, 13. Inner surrounds 42 and/or flow distributors may be positioned between adjacent sets 64, 65, 66 and an outer surround 43 may be positioned around the outermost set 66, as previously described for the inner and outer sets 12, 13. In addition, fluid treatment arrangements having more than two radially displaced sets of fluid treatment elements may be positioned in a housing to form a fluid treatment assembly, as previously described for the fluid treatment assembly 51 housing the inner and outer sets 12, 13.

The present invention is thus not restricted to the particular embodiments which have been described and/or illustrated herein but includes all embodiments and modifications that may fall within the scope of the claims.

The invention claimed is:
1. A fluid treatment arrangement comprising:
   a hollow core assembly having an interior and an axis;
   at least first and second sets of fluid treatment elements mounted along the core assembly, wherein each set includes a plurality of fluid treatment elements, wherein each fluid treatment element includes a ribbon which has a permeable fluid treatment medium and is spirally wound in a plurality of windings to define a generally disk-shaped body having a radial dimension, a first end surface on one side of the body, a second end surface on the other side of the body, and an outer rim, wherein the first set of fluid treatment elements is arranged with first spaces between at least some of the fluid treatment elements, the core assembly including openings which fluidly communicate between the first spaces and the interior of the core assembly and wherein the second set of fluid treatment elements is radially displaced from the first set of fluid treatment elements
   a surround which encircles the first spaces and fluidly blocks an outer end of the first spaces, the surround being positioned between the fluid treatment elements of the first set and the fluid treatment elements of the second set; and
   a fluid flow path which extends generally edgewise through the permeable fluid treatment medium between the first and second end surfaces of a fluid treatment element of the first set and generally edgewise through the permeable fluid treatment medium between the first and second end surfaces of a fluid treatment element of the second set to or from the interior of the core assembly.

2. The fluid treatment arrangement of claim 1 wherein the fluid treatment elements of the first set contact the core assembly and the fluid treatment elements of the second set are mounted along the core assembly radially beyond the fluid treatment elements of the first set.

3. The fluid treatment arrangement of claim 1 wherein the fluid treatment elements of the first set have outer diameters and the fluid treatment elements of the second set have inner diameters which are substantially equal to the outer diameters of the fluid treatment elements of the first set.

4. The fluid treatment arrangement of claim 1 further comprising spaces between at least some of the fluid treatment elements of the second set, wherein the spaces open onto the exterior of the fluid treatment elements of the second set and the surround fluidly blocks an inner end of the spaces.

5. A fluid treatment arrangement comprising:
   a hollow core assembly having an interior and an axis;
   at least first and second sets of fluid treatment elements mounted along the core assembly, wherein each set includes a plurality of fluid treatment elements, wherein each fluid treatment element includes a ribbon which has a permeable fluid treatment medium and is spirally wound in a plurality of windings to define a generally disk-shaped body having a radial dimension, a first end surface on one side of the body, a second end surface on the other side of the body, and an outer rim, wherein the first set of fluid treatment elements is arranged with spaces between at least some of the fluid treatment elements of the first set, the spaces including feed spaces and permeate spaces, and the second set of the fluid treatment elements is arranged with spaces between at least some of the fluid treatment elements of the second set, the spaces including feed spaces and permeate spaces, and wherein the second set of the fluid treatment elements is radially displaced from the first set of fluid treatment elements;

an inner surround encircling the permeate spaces of the first set, the inner surround fluidly blocking an outer end of the permeate spaces of the first set and an inner end of the feed spaces of the second set;

an outer surround encircling the permeate spaces of the second set, the outer surround fluidly blocking an outer end of the permeate spaces of the second set, wherein the feed spaces of the second set open onto the exterior of the fluid treatment elements of the second set and wherein the permeate spaces of the second set open into feed spaces of the first set; and a fluid flow path which extends generally edgewise through the permeable fluid treatment medium between the first and second end surfaces of a fluid treatment element of the first set and generally edgewise through the permeable fluid treatment medium between the first and second end surfaces of a fluid treatment element of the second set to or from the interior of the core assembly.

6. The fluid treatment arrangement of claim 5 wherein inner ends of the feed spaces of the first set are fluidly blocked by the core assembly and wherein the core assembly includes openings fluidly communicating between the permeate spaces of the first set and the interior of the core assembly.

7. A fluid treatment arrangement comprising:
a hollow core assembly having an interior and an axis;
at least first and second sets of fluid treatment elements mounted along the core assembly wherein each set includes a plurality of fluid treatment elements, wherein each fluid treatment element includes a ribbon which has a permeable fluid treatment medium and is spirally wound in a plurality of windings to define a generally disk-shaped body having a radial dimension, a first end surface on one side of the body, a second end surface on the other side of the body, and an outer rim, wherein the first set of fluid treatment elements is arranged with first spaces between at least some of the fluid treatment elements, the core assembly including openings which fluidly communicate between the first spaces and the interior of the core assembly and wherein the second set of fluid treatment elements is radially displaced from the first set of fluid treatment elements;

a flow distributor positioned between the first and second sets of fluid treatment elements, the flow distributor fluidly communicating between at least one space within one of the first and second sets and a plurality of spaces within the other of the first and second sets; and a fluid flow path which extends generally edgewise through the permeable fluid treatment medium between the first and second end surfaces of a fluid treatment element of the first set and generally edgewise through the permeable fluid treatment medium between the first and second end surfaces of a fluid treatment element of the second set to or from the interior of the core assembly.

8. The fluid treatment arrangement of claim 1 further comprising a third set of fluid treatment elements mounted along the core assembly radially spaced from the second set of fluid treatment elements, wherein the third set includes a plurality of fluid treatment elements, each fluid treatment element including a ribbon which has a permeable fluid treatment medium and is spirally wound in a plurality of windings to define a generally disk-shaped body having a radial dimension, a first end surface on one side of the body, a second end surface on the other side of the body, and an outer rim, and wherein the fluid flow path further extends generally edgewise through the permeable fluid treatment medium between the first and second end surfaces of a fluid treatment element of the third set to or from the interior of the core assembly.

9. A fluid treatment assembly comprising a housing and a fluid treatment arrangement of claim 1 disposed inside the housing, wherein the housing has first and second ports and defines a fluid flow path between the first and second ports, wherein the fluid treatment arrangement is positioned in the housing across the fluid flow path between the first and second ports, and wherein the fluid flow path of the fluid treatment arrangement comprises a portion of the fluid flow path between the first and second ports.

10. A method for making a fluid treatment arrangement comprising:
mounting along a core assembly first and second sets of disk-shaped fluid treatment elements, each including a spirally-wound ribbon having a permeable fluid treatment medium, including arranging the first set of fluid treatment elements with first spaces between at least some of the fluid treatment elements and radially displacing the second set of fluid treatment elements from the first set of fluid treatment elements mounting a surround around the first set of fluid treatment elements, including fluidly blocking the outer ends of the first spaces between fluid treatment elements of the first set; and arranging the first and second sets of fluid treatment elements in a fluid flow path extending generally edgewise through the permeable fluid treatment medium between first and second end surfaces of a fluid treatment element of the first set and generally edgewise through the permeable fluid treatment medium between first and second end surfaces of a fluid treatment element of the second set.

11. The method of claim 10 wherein mounting the first set of fluid treatment elements includes forming each fluid treatment element of the first set by spirally winding a ribbon having a permeable fluid treatment medium in a plurality of windings to form a disk-shaped body having a first end surface, a second opposite end surface, and an outer rim.

12. The method of claim 10 wherein spirally winding the ribbon includes winding the ribbon around the exterior of the core assembly, the method further comprising sealing the ribbon against the exterior of the core assembly.

13. The method of claim 10 wherein mounting the second set of fluid treatment elements includes forming each fluid treatment element of the second set by spirally winding a ribbon having a permeable fluid treatment medium in a plurality of windings to form a disk-shaped body having a first end surface, a second opposite end surface and an outer rim.

14. The method of claim 13 wherein spirally winding the ribbon includes winding the ribbon around the fluid treatment elements of the first set.

15. The method of claim 10 wherein mounting the second set of fluid treatment elements includes positioning fluid treatment elements of the second set over the surround.

16. The method of claim 15 wherein mounting the surround comprises mounting an inner surround around the first set of fluid treatment elements, the method further comprising mounting an outer surround around the second set of fluid treatment elements including fluidly blocking the outer ends of at least some spaces between fluid treatment elements of the second set.

17. A method for making a fluid treatment arrangement comprising:
mounting along a core assembly first and second sets of disk-shaped fluid treatment elements, each including a spirally-wound ribbon having a permeable fluid treatment medium, including radially displacing the second set of fluid treatment elements from the first set of fluid treatment elements;

arranging the first and second sets of fluid treatment elements in a fluid flow path extending generally edgewise through the permeable fluid treatment medium between first and second end surfaces of a fluid treatment element first set and generally edgewise through the permeable fluid treatment medium between first and second end surfaces of a fluid treatment element of the second set; and positioning a flow distributor between the first and second sets of fluid treatment elements, including forming an axial flow path between at least one space within one of the first and second sets and a plurality of spaces within the other of the first and second sets, the axial flow path being part of the fluid flow path.

18. A method for treating a fluid comprising:

directing a fluid between the exterior of a fluid treatment arrangement and the interior of a core assembly, including passing the fluid generally edgewise through windings of a permeable fluid treatment medium between first and second end surfaces of a fluid treatment element of a first set of fluid treatment elements and passing the fluid generally edgewise through windings of a permeable fluid treatment medium between first and second end surfaces of a fluid treatment element of a second set of fluid treatment elements radially displaced from the first set of fluid treatment elements, wherein directing the fluid further includes passing the fluid into a first space between adjacent fluid treatment elements of the first set and passing the fluid through a surround positioned between the first and second sets of the fluid treatment elements, the surround blocking off the outer end of the first space.

19. The method of claim 18 wherein directing the fluid includes directing the fluid from the exterior of the fluid treatment arrangement to the interior of the core assembly.

20. The method of claim 18 further comprising passing the fluid generally axially along a flow distributor positioned between the first and second fluid treatment elements.

* * * * *